United States Patent
Jiang et al.

(10) Patent No.: US 9,960,924 B2
(45) Date of Patent: May 1, 2018

(54) CONFERENCE SYSTEM, SERVER, AND COMPUTER-READABLE MEDIUM STORING CONFERENCE INFORMATION GENERATION PROGRAM

(71) Applicant: FUJITSU LIMITED, Kawasaki-shi, Kanagawa (JP)

(72) Inventors: Shan Jiang, Zama (JP); Yuichi Murase, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 615 days.

(21) Appl. No.: 14/041,409

(22) Filed: Sep. 30, 2013

(65) Prior Publication Data
US 2014/0143345 A1 May 22, 2014

(30) Foreign Application Priority Data

Nov. 16, 2012 (JP) .................................. 2012-252419

(51) Int. Cl.
*H04L 12/18* (2006.01)
*G06F 11/34* (2006.01)

(52) U.S. Cl.
CPC .......... *H04L 12/1831* (2013.01); *G06F 11/34* (2013.01); *G06F 11/3438* (2013.01); *H04L 12/1813* (2013.01)

(58) Field of Classification Search
CPC ... H04L 12/1831; G06F 11/34; G06F 11/3438
See application file for complete search history.

(56) References Cited

U.S. PATENT DOCUMENTS 6,459,442 B1* 10/2002 Edwards ............. G06F 3/04883
715/700
7,624,166 B2* 11/2009 Foote ................... H04B 10/116
463/47
(Continued)

FOREIGN PATENT DOCUMENTS

JP          5-316506       11/1993
JP       2005-267500        9/2005
(Continued)

OTHER PUBLICATIONS

Office Action dated Mar. 1, 2016 in corresponding Japanese Patent Application No. 2012-252419.
(Continued)

*Primary Examiner* — Aaron Strange
(74) *Attorney, Agent, or Firm* — Staas Halsey LLP

(57) ABSTRACT

A conference system includes at least one server and at least one mobile terminal connectable to the server. The mobile terminal includes an orientation estimation unit configured to detect orientation information of the mobile terminal, an operation unit configured to detect operation information of an operation performed; and an event transmission unit configured to transmit the orientation information and the operation information. The server includes an image information generation unit configured to generate image information of a conference material and image information of a pointer drawn over the image information of the conference material based on the drawing event, and an action information generation unit configured to generate action information corresponding to the conference material based on drawing history information of the drawn pointer.

12 Claims, 18 Drawing Sheets

(56) References Cited

U.S. PATENT DOCUMENTS

| | | | |
|---|---|---|---|
| 2003/0103148 A1* | 6/2003 | Ejima | H04N 5/772 348/231.3 |
| 2004/0236830 A1* | 11/2004 | Nelson | H04L 29/06027 709/204 |
| 2005/0030255 A1* | 2/2005 | Chiu | G06F 3/04883 345/1.3 |
| 2005/0052338 A1* | 3/2005 | Suzuki | H04N 7/15 345/1.1 |
| 2007/0043719 A1 | 2/2007 | Nagamine et al. | |
| 2007/0136790 A1* | 6/2007 | Hoffman | G06F 9/443 726/4 |
| 2008/0228910 A1* | 9/2008 | Petri | G06F 17/30905 709/224 |
| 2008/0252595 A1* | 10/2008 | Boillot | G06F 3/011 345/156 |
| 2009/0148124 A1* | 6/2009 | Athsani | G06Q 30/02 386/241 |
| 2010/0214323 A1 | 8/2010 | Sakaue | |
| 2012/0144283 A1* | 6/2012 | Hill | G06F 17/242 715/211 |
| 2013/0113993 A1* | 5/2013 | Dagit, III | G06F 3/017 348/552 |
| 2013/0132833 A1* | 5/2013 | White | G06F 3/048 715/704 |
| 2013/0150120 A1* | 6/2013 | Wu | G06F 1/1626 455/556.1 |
| 2014/0068498 A1* | 3/2014 | Olsen | G06F 11/32 715/781 |
| 2014/0119243 A1* | 5/2014 | Oike | H04L 12/1827 370/260 |

FOREIGN PATENT DOCUMENTS

| | | |
|---|---|---|
| JP | 2007-52566 | 3/2007 |
| JP | 2009-294984 | 12/2009 |
| JP | 2010-198130 | 9/2010 |
| JP | 2012-43250 | 3/2012 |
| WO | 2011/048901 A1 | 4/2011 |

OTHER PUBLICATIONS

Japanese Office Action dated Sep. 20, 2016 in corresponding Japanese Patent Application No. 2012-252419.

* cited by examiner

FIG. 7

| | | | |
|---|---|---|---|
| T1 CONNECTION TABLE | TERMINAL ID | TIME STAMP | CONNECTION/ DISCONNECTION |
| T2 POINTER DRAWING START/STOP TABLE | TERMINAL ID | TIME STAMP | START/STOP |
| T3 POINTER MOVEMENT TABLE | TERMINAL ID | TIME STAMP | MOVEMENT POSITION INFORMATION |
| T4 AREA DRAWING START/STOP TABLE | TERMINAL ID | TIME STAMP | START/STOP |
| T5 AREA DRAWING SIZE CONTROL TABLE | TERMINAL ID | TIME STAMP | SIZE INFORMATION |
| T6 SOUND RECORDING START/STOP TABLE | TERMINAL ID | TIME STAMP | START/STOP |
| T7 PAGE TRANSITION TABLE | TERMINAL ID | TIME STAMP | CURRENT PAGE |

| | DEVICE ID | TIME STAMP | NOTIFICATION INFORMATION |
|---|---|---|---|
| E21 → | 358938040636200 | 1336528530212410 | start |
| E22 → | 358938040636200 | 1336529170031520 | stop |
| E23 → | 357194041397217 | 1337907262703850 | start |
| | 357194041397217 | 1337907290929720 | stop |
| ... | 358938040636200 | 1337907734981440 | start |
| | 358938040636200 | 1337907772352210 | stop |
| | 357194041397217 | 1337911196162440 | start |
| | 357194041397217 | 1337911434597710 | stop |

FIG. 10

| | DEVICE ID | TIME STAMP | MOVEMENT POSITION INFORMATION (X, Y) | |
|---|---|---|---|---|
| E31 → | 358938040636200 | 1336528533667670 | -2 | -6 |
| E32 → | 358938040636200 | 1336528533698870 | -1 | -8 |
| E33 → | 358938040636200 | 1336528533854870 | -3 | -7 |
| | 358938040636200 | 1336528533886070 | -2 | -13 |
| | 358938040636200 | 1336528533901670 | -2 | -10 |
| | 358938040636200 | 1336528533948470 | -2 | -8 |
| | 358938040636200 | 1336528533995270 | -6 | 3 |
| | 358938040636200 | 1336528534010870 | -6 | 4 |
| | 358938040636200 | 1336528534026470 | -9 | 3 |
| | 358938040636200 | 1336528534057670 | -17 | 1 |
| | 358938040636200 | 1336528534088870 | -16 | 1 |

| DEVICE ID | TIME STAMP | NOTIFICATION INFORMATION |
|---|---|---|
| 358938040636200 | 1336528530212410 | start |
| 358938040636200 | 1336529170031520 | stop |
| 357194041397217 | 1337907262703850 | start |
| 357194041397217 | 1337907290929720 | stop |
| 358938040636200 | 1337907734981440 | start |
| 358938040636200 | 1337907772352210 | stop |
| 357194041397217 | 1337911196162440 | start |
| 357194041397217 | 1337911434597710 | stop |

E41 →
E42 →
E43 →
...

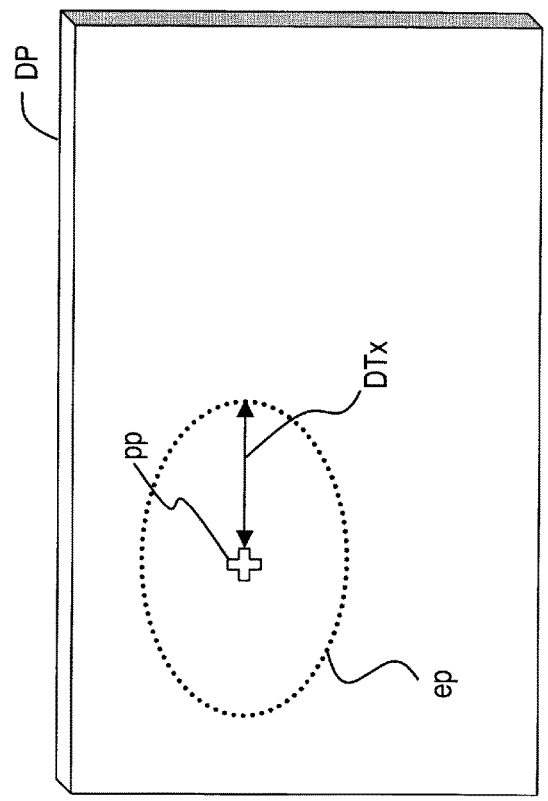
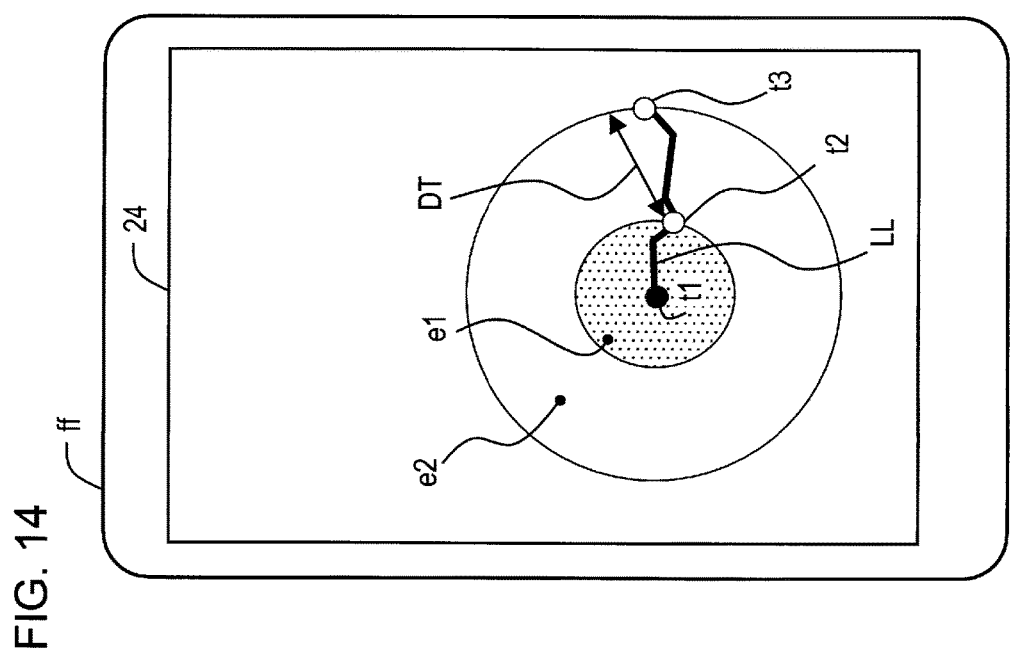
FIG. 14

| DEVICE ID | TIME STAMP | NOTIFICATION INFORMATION |
|---|---|---|
| 358938040636200 | 1336528530212410 | start |
| 358938040636200 | 1336529170031520 | stop |
| 357194041397217 | 1337907262703850 | start |
| 357194041397217 | 1337907290929720 | stop |
| 358938040636200 | 1337907734981440 | start |
| 358938040636200 | 1337907772352210 | stop |
| 357194041397217 | 1337911196162440 | start |
| 357194041397217 | 1337911434597710 | stop |

E61 → row 1
E62 → row 2
E63 → row 3
...

FIG. 18
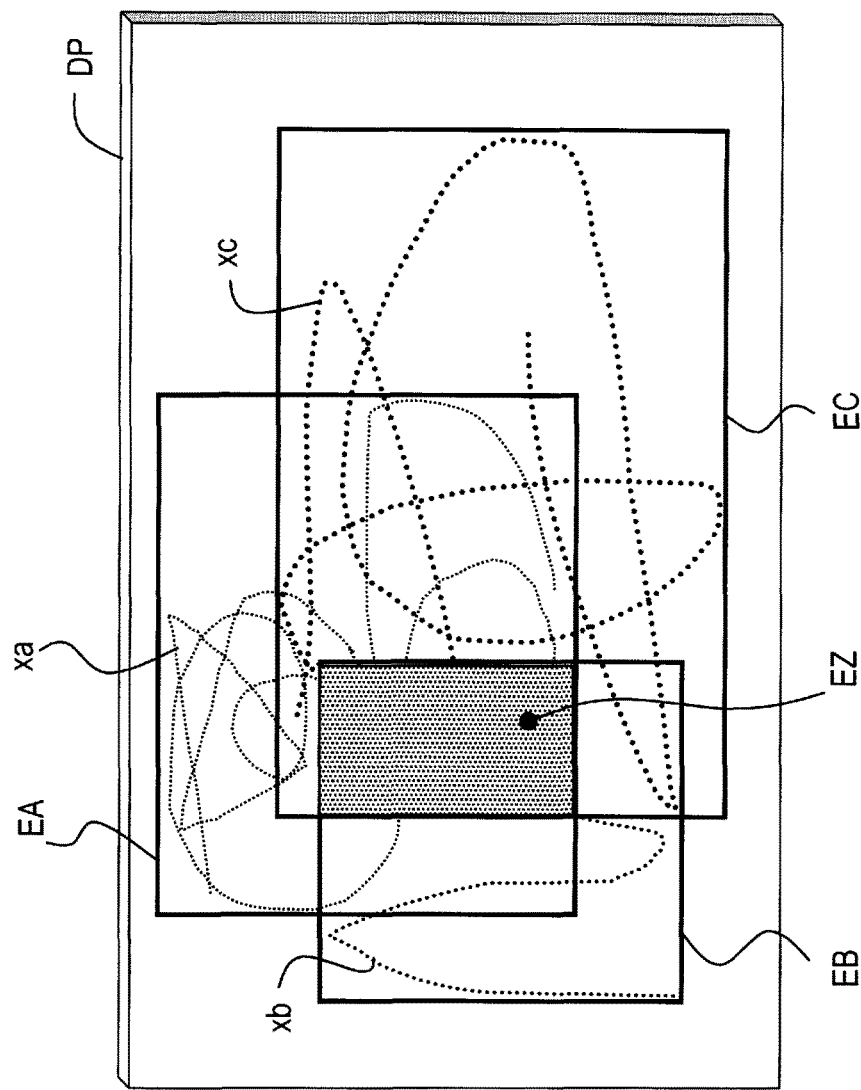
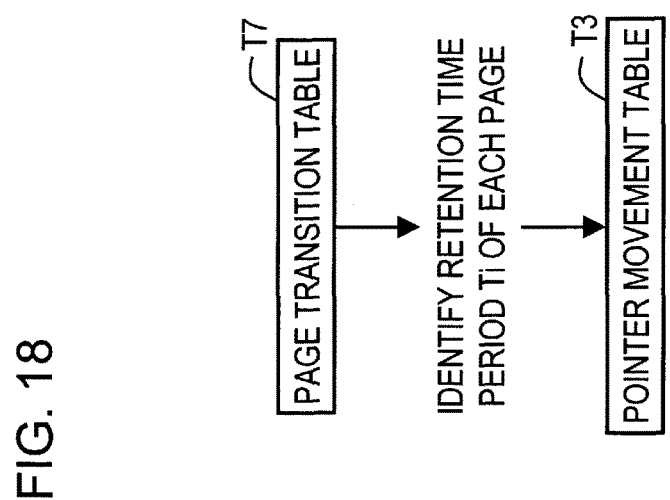

CONFERENCE SYSTEM, SERVER, AND COMPUTER-READABLE MEDIUM STORING CONFERENCE INFORMATION GENERATION PROGRAM

CROSS-REFERENCE TO RELATED APPLICATION

This application is based upon and claims the benefit of priority of the prior Japanese Patent Application No. 2012-252419, filed on Nov. 16, 2012, the entire contents of which are incorporated herein by reference.

FIELD

The embodiment discussed herein is relates to a conference system, a server, and computer-readable medium storing a conference information generation program.

BACKGROUND

Generally, after a conference, minutes are prepared or the like to record or to allow a third person who has not attended the conference to check the content of the conference and speeches made by attendees at the conference. However, it takes a long time and is a hard work for a person to prepare the minutes.

Thus, it is a common practice to record the contents of the conference and the speeches made by the attendees as images and sounds with a video camera, a sound recorder, and the like, so that the contents can be checked after the conference. Furthermore, a conference system has been proposed that records sounds and images in the conference and further records documents used in the conference and information of the attendees and the like (Japanese Unexamined Patent Application Publication No. 2007-0525666).

However, a third person has not been able to detect in advance, what kind of speech was made on what time during the conference or on what part of a conference material. Moreover, the third person has not been able to detect what time during the conference and on what part of the conference material the explanation and the argument have been most active. Thus, the third person has played the recorded sounds and images from the top to obtain desired information and check the key speech and the key conference material in the conference. This is a cumbersome procedure leading to an increase in time and cost.

Recording using the sound recorder allows a user to detect a speech in the conference, but does not allow the user to detect on which part of the conference material the speech was made. Furthermore, it takes a cost to prepare the video camera, the sound recorder, and the like.

SUMMARY

According to a first aspect of the embodiment, a conference system includes at least one server and at least one mobile terminal connectable to the server, wherein the mobile terminal includes: an orientation estimation unit configured to detect orientation information of the mobile terminal; an operation unit configured to detect operation information of an operation performed on the mobile terminal by a user; and an event transmission unit configured to transmit, to the server, the orientation information and the operation information respectively detected by the orientation estimation unit and the operation unit as a drawing event, and wherein the server includes: an image information generation unit configured to generate image information of a conference material including at least one page and image information of a pointer drawn over the image information of the conference material based on the drawing event; and an action information generation unit configured to generate action information corresponding to the conference material based on drawing history information of the drawn pointer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating the types of tables in the database DB of the server SV.

FIG. 9 is a diagram illustrating an example of the pointer drawing start/stop table T2.

FIG. 10 illustrates an example of the pointer movement table T3.

FIG. 12 is a diagram illustrating an example of the area drawing start/stop table T4.

FIG. 14 is a diagram illustrating generation processing for the size of the area pointer.

FIG. 15 is a diagram illustrating an example of the sound recording start/stop table T6.

FIG. 18 is a drawing for explaining the generation processing for the pointer drawing activeness level corresponding to a position in a displayed page.

DESCRIPTION OF EMBODIMENTS

An embodiment of the present invention will be described below with reference to the drawings. It is to be noted that the technical scope of the present invention is not limited to the embodiment, and includes matters described in the claims and their equivalents.

[Conference System]

Figure 1:
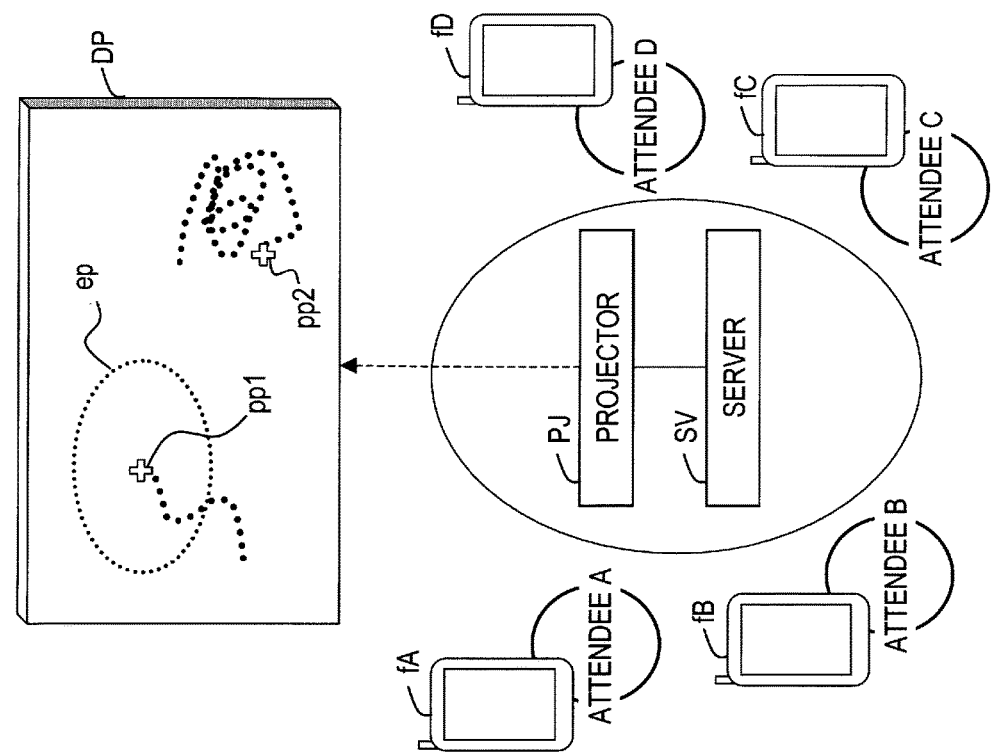
FIG. 1 is a diagram illustrating an example of a conference system according to the embodiment.

FIG. 1 is a diagram illustrating an example of a conference system according to the embodiment. The conference system in FIG. 1 includes, for example, a server SV, a projector PJ that displays on a display panel DP, image data such as a conference material generated by the server SV, and mobile terminals fA to fD capable of communicating with the server SV. In the example illustrated in FIG. 1, four attendees A to D are in the conference and respectively have the mobile terminals fA to fD such as smartphones.

In the conference system according to the embodiment, for example the attendee A uses the mobile terminal fA as a pointing device that draws a pointer over the conference material on the display panel DP. Through an operation on a touch panel of the mobile terminal fA and change in the orientation of the mobile terminal fA, the attendee A draws pointers pp1 and pp2 and an area pointer ep having an elliptical shape, a rectangular shape, and the other shapes on the display panel DP. The mobile terminal fA records speech information of the attendee A as a sound file. In the conference system according to the embodiment, the pointers pp1 and pp2 and the area pointer ep can be simultaneously drawn by the plurality of mobile terminals fA to fD.

In the conference system according to the embodiment, the server SV records drawing history information of drawn pointers. The drawing history information is, for example, a history of drawing position information of the drawn pointer corresponding to a displayed page of the conference material. The server SV generates action information corresponding to the conference material on the basis of the drawing history information of the drawn pointer. The action information will be described below.

[Action Information]

Figure 2:
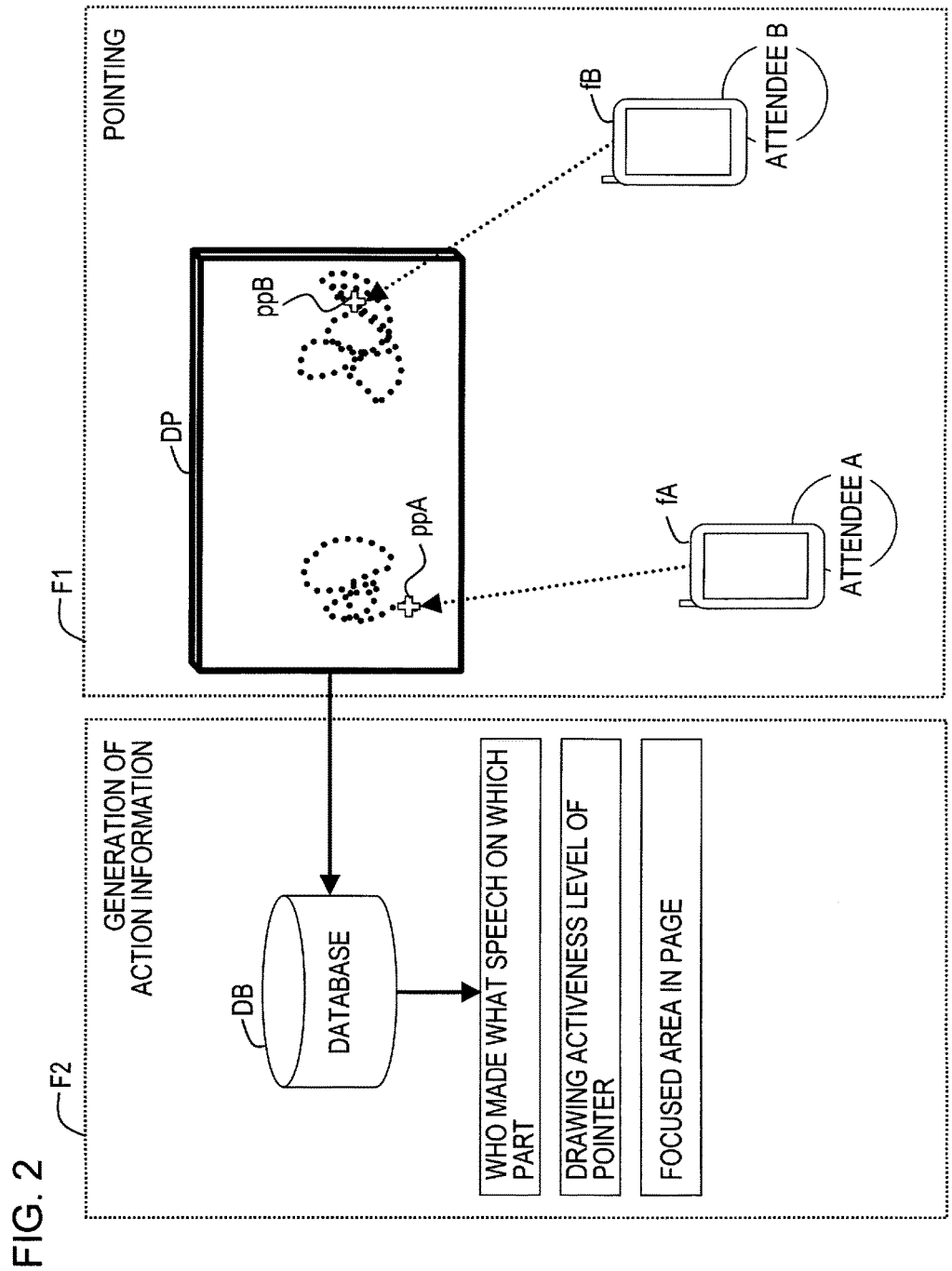
FIG. 2 is a diagram illustrating the action information corresponding to the conference material, generated in the conference system according to the embodiment.

FIG. 2 is a diagram illustrating the action information corresponding to the conference material, the action information being generated in the conference system according to the embodiment. The server SV of the conference system according to the embodiment accumulates in a database DB, history information of drawing of the pointers ppA and ppB performed by the mobile terminals fA and fB (F1), and generates action information corresponding to the conference material on the basis of the drawing history information (F2).

The action information is, for example, at least one of the drawing position information of the pointers ppA and ppB corresponding to a chronological displayed page of the conference material, and sound position information indicating at least a part of a sound file at the time when the pointers ppA and ppB is drawn. Thus, based on the action information, a user can detect a section in the sound file indicating who made what kind of speech on what part in which page in the conference material.

Alternatively, the action information is a drawing activeness level indicating a drawing amount of the pointer ppA, ppB. The drawing activeness level is generated in such a manner as to correspond to a page of the conference material or a position in the page (focused area), or to a displayed chronological page of the conference material (hereinafter, referred to as a chronological displayed page) or a position in the chronological displayed page (focused area). Thus, the user can refer to a page in which a large amount of pointers are drawn (including a displayed page) in the conference and the focused area where a large amount of pointers are drawn in the page in the conference. Accordingly, the user can detect the page, the displayed page, and the focused area where the explanation and the discussion were most active in the conference.

The action information will be described below with specific examples.

[Specific Example of Action Information]

Figure 3:
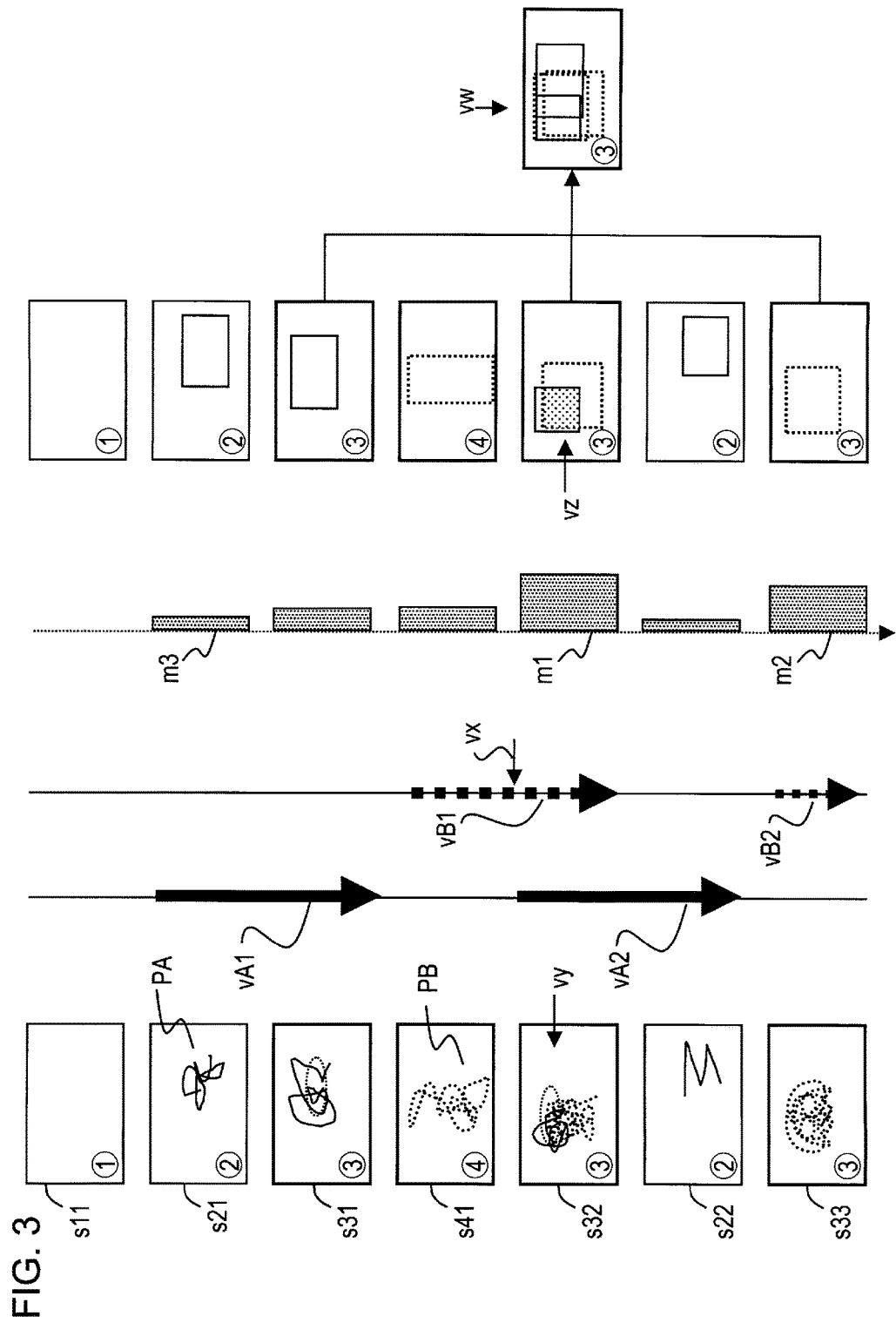
FIG. 3 is a diagram illustrating one specific example of the action information.

FIG. 3 is a diagram illustrating one specific example of the action information. In FIG. 3, for example, sound recording information vA1, vA2, vB1, and vB2, drawing activeness levels m1 to m3, and a drawing activeness level vz corresponding to a position in a page are illustrated correspondingly to the chronological displayed pages displayed in the conference. In this example, the conference material has total of 4 pages that are displayed in the order of the first page s1-1 to the forth page s4-1, the third page s3-2, the second page s2-2, and again the third page s3-3.

In the chronological displayed pages s1-1, s2-1, s3-1, s4-1, s3-2, s2-2, and s3-3 illustrated in a left portion of FIG. 3, trajectories of the drawn pointers are illustrated. Specifically, a trajectory PA of the pointer drawn by the mobile terminal fA is illustrated by a solid line, and a trajectory PB of the pointer drawn by the mobile terminal fB is illustrated by a dotted line. In addition, arrows vA1, vA2, vB1, and vB2 pointing downward in a center portion in FIG. 3 indicate that the sound information is recorded while the corresponding displayed pages are displayed. Specifically, the sound information generated by the mobile terminal fA is represented by the solid line arrows vA1 and vA2, and the sound information generated by the mobile terminal fB is represented by the dashed line arrows vB1 and vB2.

In the embodiment, it is assumed that an attendee drawing the pointer makes a sound while a pointer is drawn. This is based on an assumption that when any position in a page is pointed, a speech is made on that position. Thus, for example, when a pointer is drawn by a mobile terminal, a sound file is generated in the mobile terminal. In the example of FIG. 3, while pointers (in solid line) are drawn by the mobile terminal fA in the displayed pages s2-1 and s3-1, a sound file is generated by the mobile terminal fA as indicated by the arrow vA1. Similarly, while pointers (in dashed line) are drawn by the mobile terminal fB in the displayed pages s4-1 and s3-2, a sound file is generated by the mobile terminal fB as indicated by the arrow vB1.

In FIG. 3, bar graphs illustrated in halftone represent drawing activeness levels of pointers corresponding to displayed pages. For example, the drawing activeness level of the pointer is generated on the basis of a drawing amount of the pointer represented by a drawing time of the pointer on a page or a displayed page and the number of mobile terminals with which the drawing is performed on the page or the displayed page, in such a manner that the drawing activeness level of the pointer rises as the drawing amount of the pointer increases. Thus, for example, the drawing activeness levels m1 and m2 respectively corresponding to the displayed pages s3-2 and s3-3 with large drawing amounts of the pointers are high, and the drawing activeness level m3 corresponding to the displayed page s2-1 with a small drawing amount of the pointer is low. The user can detect a page or a displayed page in which a large amount of pointers is drawn by referring to the drawing activeness level corresponding to a page or a displayed page. The user can further detect the drawing position information of a pointer in the detected page and a sound file section (position information) indicating at least a part of a corresponding sound file. The sound position information is information indicating at least a part of a sound file and indicating a position or a section in the sound file.

The drawing activeness level of the pointer is not limited to the bar graphs exemplified in FIG. 3. The drawing activeness level of the pointer may be represented by values, ranks, or other types of graphs. Generation processing for the drawing activeness level will be described later in detail.

In a right portion of FIG. 3, drawing activeness levels respectively corresponding to positions in the displayed pages are illustrated. In this example, for example, a position with a high drawing activeness level is illustrated as the focused area. In this example, the focused area of the mobile terminal fA and the focused area of the mobile terminal fB are respectively illustrated in a solid line and a dotted line. The user can detect the position in the page where a large amount of pointers is drawn, by referring to the drawing activeness level. For example, in the displayed page s3-2, pointes are drawn by the mobile terminals fA and fB, and the focused areas of the respective mobile terminals fA and fB and an overlapped area vz of the focused areas are illustrated. Thus, the user can detect, for example, the focused area vz in which the pointers are most actively drawn in the displayed page s3-2.

The user can further detect the drawing position information of the pointer corresponding to the page and the sound position information at the time when the pointer is drawn, on the basis of the drawing history information including the history of drawing position information of the drawn pointer as illustrated in FIG. 3. In other words, the user can detect that the attendee B using the mobile terminal fB has made a speech indicated by the sound position information vx in the sound file, regarding a drawing position vy in the displayed page s3-2.

In the example of FIG. 3, the drawing activeness level is generated for each displayed pages. Alternatively, the drawing activeness level may be generated for each page, as a sum of drawing activeness levels of displayed pages representing the same page. For example, in a right portion on FIG. 3, a drawing activeness level vw corresponding to a position in the page 3 is illustrated. This allows the user to detect, in a unit of a page, the page in which a drawing amount of a pointer is large and a drawing activeness level corresponding to a position in the page.

A configuration diagram of the conference system according to the embodiment will be described below.

[Configuration Diagram of Conference System]

Figure 4:
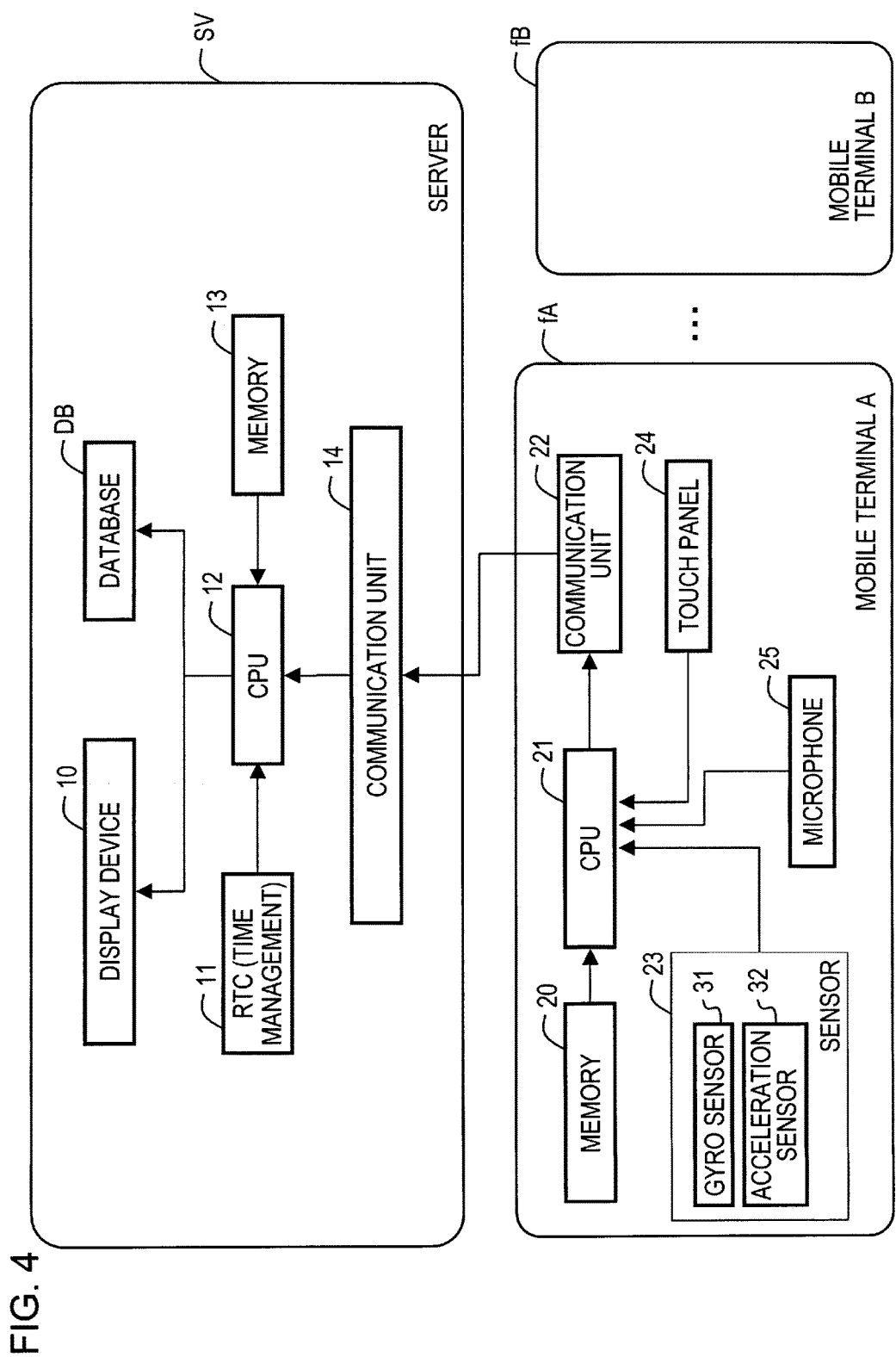
FIG. 4 is a diagram illustrating an example of the configuration diagram of the conference system according to the embodiment.

In FIG. 4, an example of the configuration diagram of the conference system according to the embodiment is illustrated. In FIG. 4, one mobile terminal fA of the plurality of mobile terminals fA and fB that are connected to the server SV will be described. For example, the server SV is a computer, and the mobile terminals fA and fB are smartphones in each of which a platform such as Android is installed.

The configuration of the conference system according to the embodiment is not limited to that in which a plurality of mobile terminals are connected to the server SV, and only a single mobile terminal may be connected to the server SV. In the embodiment, the conference includes, for example, presentation using a digital signage in addition to that illustrated in FIG. 1. In the case of the presentation, for example, the conference system includes a display panel of the digital signage used for advertisement, marketing, and the like, a server, and a single mobile terminal.

[Configuration Diagram of Mobile Terminal]

In FIG. 4, the mobile terminal fA includes, for example, a central processing unit (CPU) 21, a memory 20, a communication unit 22, a sensor 23, a microphone 25, and a touch panel 24. The other mobile terminal fB connected to the server SV includes the same configuration.

The touch panel 24 detects operation information on the basis of an operation of an attendee. The microphone 25 acquires sound information of a speech made by the attendee, and generates a sound file. The sensor 23 includes, for example, a gyro sensor 31 and an acceleration sensor 32. The gyro sensor 31, for example, detects angular velocities about axes in X, Y and Z directions corresponding to the mobile terminal fA, and the acceleration sensor 32 detects accelerations in the directions. The sensor 23 detects orientation information of the mobile terminal fA on the basis of outputs from the gyro sensor 31 and the acceleration sensor 32.

The memory 20, for example, stores therein a terminal program of the conference system according to the embodiment. The terminal program works together with the CPU 21 to generate an event on the basis of the operation information detected by the touch panel 24, the sound file generated by the microphone 25, and the orientation information detected by the sensor 23, and transmits the event to the server SV through the communication unit 22. In this example, the event includes a device ID for identifying a plurality of mobile terminals fA and fB, which allows a mobile terminal in which the event has been generated to be identified.

[Configuration Diagram of Server SV]

In FIG. 4, the server SV, for example, includes a CPU 12, a memory 13, a real time clock (RTC) 11, the database DB, a display device 10, and a communication unit 14. The display device 10 is, for example, a large screen display that displays image data generated by the server SV. The display device 10 may be provided in another device connectable to the server SV.

The RTC 11 is a chip dedicated for managing time, and generates time and date information of the server SV. The memory 13 stores therein a server program of the conference system. The server program works together with the CPU 12 to control generation processing for image information of the pointer drawn on the display device 10 and for image information of the conference material based on an event received through the communication unit 14. The server program registers the received event in the database DB. The database DB includes a plurality of tables corresponding to different types of events. The action information is generated on the basis of the information registered in the database DB.

Block diagrams of a mobile terminal ff and the server SV in the conference system will described below.

[Block Diagram of Conference System]

Figure 5:
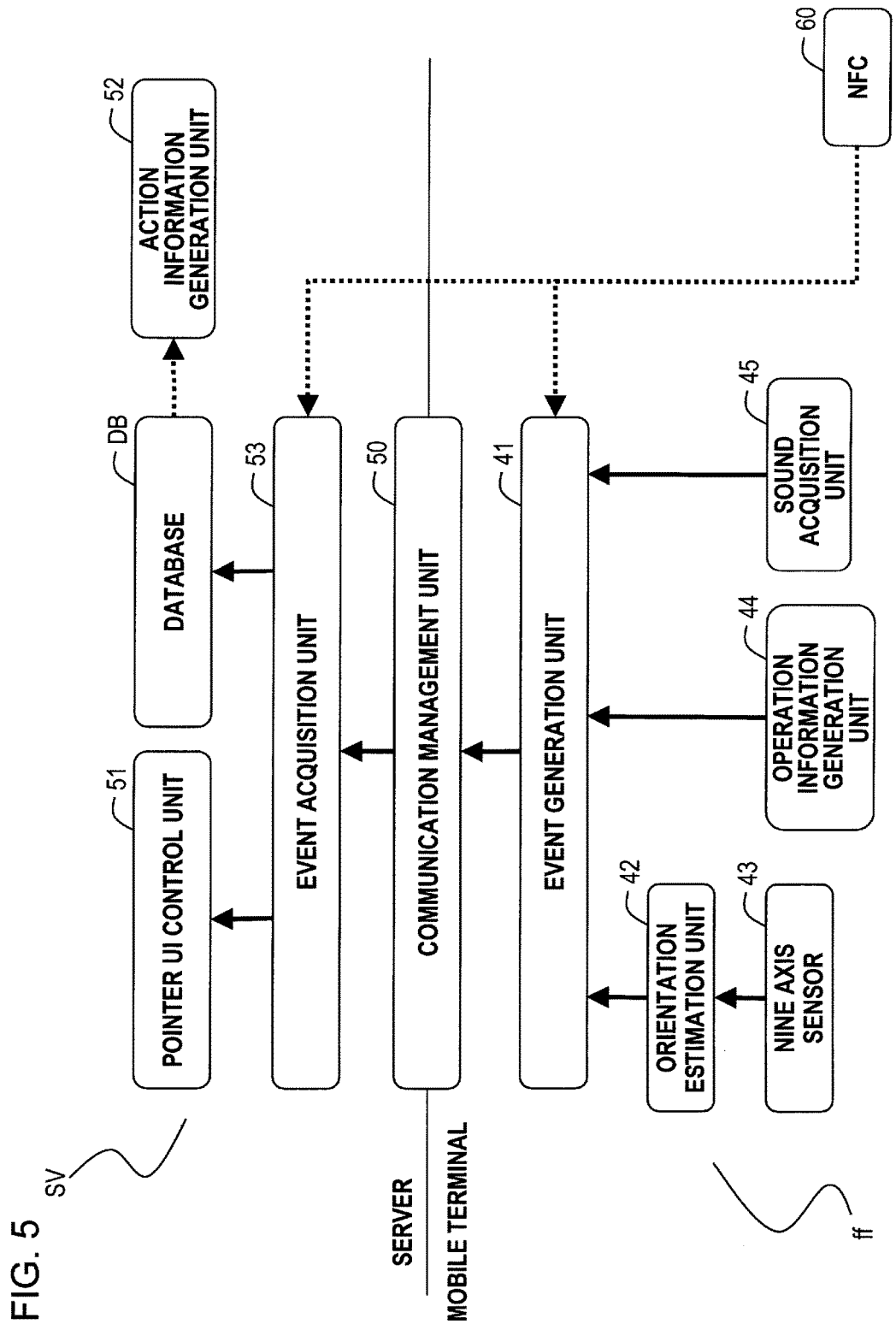
FIG. 5 illustrates an example of block diagrams of the conference system according to the embodiment.

FIG. 5 illustrates an example of block diagrams of the conference system according to the embodiment. In the figure, block diagrams of the server SV and one mobile terminal ff are exemplified.

[Block Diagram of Mobile Terminal ff]

In FIG. 5, the mobile terminal ff includes an operation information generation unit 44, a nine axis sensor 43, an orientation estimation unit 42, a sound acquisition unit 45, an event generation unit 41, and a communication management unit 50. The operation generation unit 44 detects a button pressing operation, a long pressing operation, a flick operation, and the like performed by an attendee, and detects the operation information. The nine axis sensor 43 detects angular velocities of X, Y, and Z axes corresponding to the mobile terminal ff, and outputs the angular velocities to the orientation estimation unit 42. The orientation estimation unit 42 generates the orientation information on the basis of the angular velocities outputted from the nine axis sensor 43. The sound acquisition unit 45 acquires the speech information of the attendee, and generates a sound file.

The event generation unit 41 generates an event upon receiving information detected and generated by the orientation estimation unit 42, the operation information generation unit 44, and the sound acquisition unit 45. Specifically, the event generation unit 41 generates a drawing event on the basis of the orientation information generated by the orientation estimation unit 42 and the operation information detected by the operation information generation unit 44. The event generation unit 41 generates a sound event upon receiving the sound file generated by the sound acquisition unit 45. The event generation unit 41 transmits the drawing event and the sound event including the sound file to the server SV through the communication management unit 50.

For example, the communication management unit 50 performs communication control based on radio communications such as Wi-Fi and Bluetooth (registered trademark). Communication information such as an IP address and device information of the server SV as a connection destination in the radio communication is registered, for example, in the communication management unit 50 of the mobile terminal ff in advance. The communication information of the server SV may be registered in a near field communication (NFC) tag 60 so as to be acquired when the mobile terminal ff is brought into contact with the NFC tag 60. NFC is an international radio communication standard, and is a low power radio communication technology for a close distance of ten centimeters or more. The operation information may also be detected when the mobile terminal ff is brought in contact with the NFC tag 60. Thus, setting of the communication information of the server SV can be omitted, and the operation information can be detected more easily.

[Block Diagram of Server SV]

In FIG. 5, the server SV includes, for example, the communication management unit 50, an event acquisition unit 53, a pointer UI control unit 51, the database DB, and an action information generation unit 52. The event acquisition unit 53 acquires an event transmitted from the mobile terminal ff through the communication management unit 50 and registers the information of the event in the database DB. Thus, the drawing history information of the drawn pointer is accumulated in the database DB. When the acquired event represents the drawing event, the event acquisition unit 53 notifies the pointer UI control unit 51 of the drawing event. In addition, the pointer UI control unit 51 generates the image information of the conference material, and generates the image information of a pointer and an area pointer drawn in the display device 10 on the basis of the notified drawing event. The pointer UI control unit 51 performs user interface control such as page transition of the conference material. The action information generation unit 52 generates the action information on the basis of the drawing history information of the pointer registered in the database DB. The tables and generation processing for the action information will be described later in detail.

Now, transition of the states of the mobile terminal ff and the server SV is described.

[State Transition Diagram]

Figure 6:
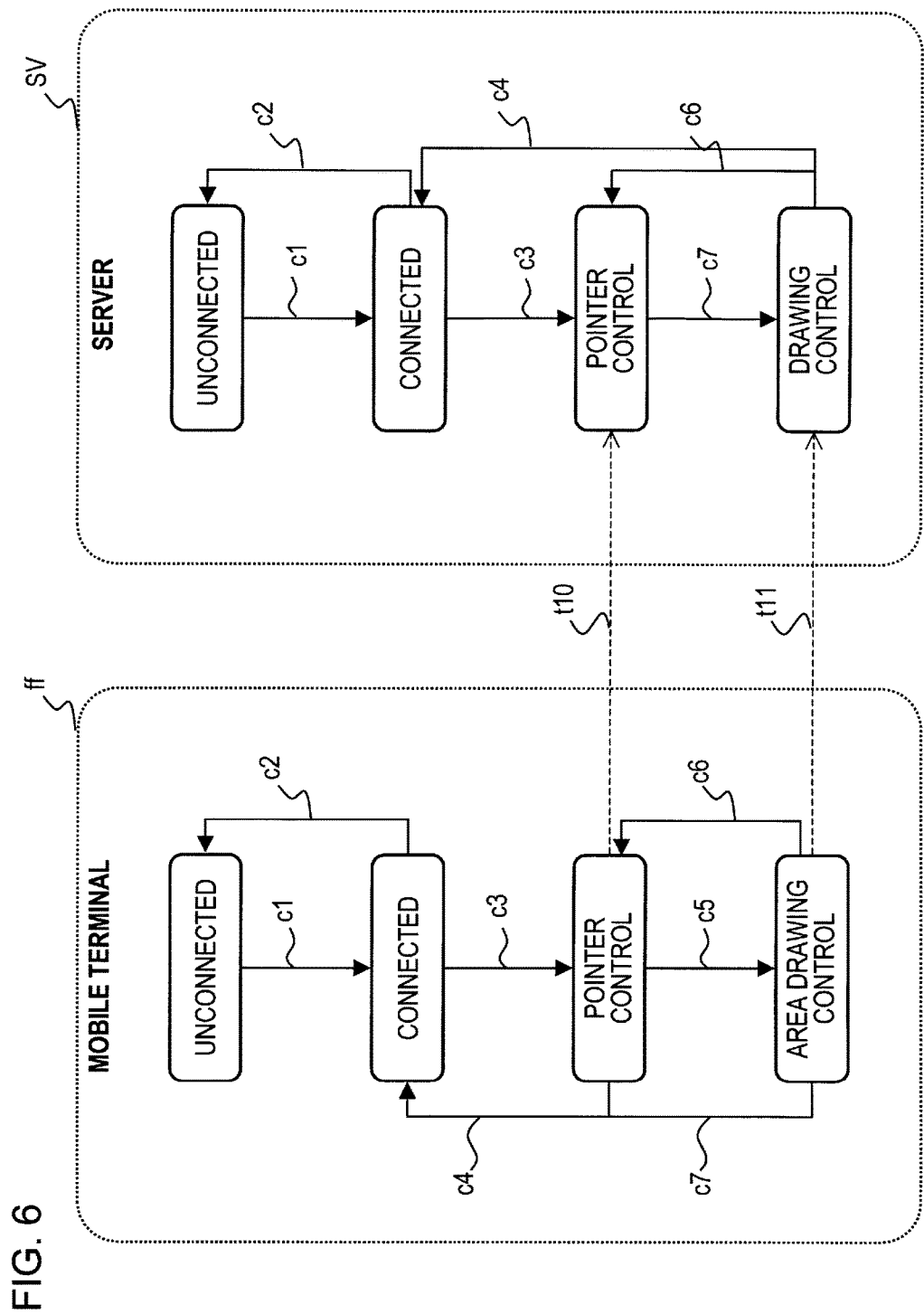
FIG. 6 is a diagram illustrating the state transition of the server SV and the mobile terminal ff of the conference system according to the embodiment.

FIG. 6 is a diagram illustrating the state transition of the server SV and the mobile terminal ff of the conference system according to the embodiment. First of all, for example, when a button in the touch panel 24 of the mobile terminal ff is pressed, an application starts. Thus, the terminal program starts and a connection event is generated so that the mobile terminal ff and the server SV transition to a connected state. Accordingly, the mobile terminal ff and the server SV transition to the connected state from an unconnected state (c1). When the application ends in the connected state, a disconnection event is generated, and the mobile terminal ff and the server SV returns to the unconnected state from the connected state (c2).

When the long pressing operation on the touch panel 24 of the mobile terminal ff performed by the attendee is detected, a pointer drawing start event is generated, and the mobile terminal ff and the server SV transition to a pointer control state from the connected state (c3). In the pointer control state, a pointer moving event including the orientation information of the mobile terminal ff is transmitted from the mobile terminal ff to the server SV, for example, every 50 ms. The server SV moves the drawing position of the pointer on the basis of the orientation information included in the pointer movement event. Thus, the pointer that has been drawn on the display panel DP moves in accordance with the change of the orientation of the mobile terminal ff in the upper-lower and left-right directions under the long pressing state.

When the movement of the position in the touch panel 24 pressed by a finger is detected under the pointer control state, an area drawing start event is generated, and the mobile terminal ff and the server SV transition to an area drawing control state from the pointer control state (c5). At this point (t10), the server SV makes a transparent drawing window on which an area pointer having an elliptical shape and the like with a pointer as the center disposed as a front most screen on the display panel DP. In the area drawing control state, an area drawing control event including a size of the area pointer is transmitted from the mobile terminal ff to the server SV, for example, every 50 ms. Thus, under the area drawing control state, the size of the area pointer is changed in accordance with a movement of the pointer corresponding to the orientation change and the movement of the finger in the long pressing state.

In the drawing control state, when the position pressed by the finger returns to the initial position, an area drawing stop event is generated, and the mobile terminal ff and the server SV transition to the pointer control state (c6). At this point (t11), the transparent drawing window on which the area pointer has been drawn is rearranged to be disposed as the rear most screen, and the area drawing ends. When the finger performing the long pressing on the touch panel 24 is separated in the drawing control state and the pointer control state, the area drawing stop event and the pointer drawing stop event are generated and the mobile terminal ff and the server SV transition to the connected state (c4 and c7).

As described above, in accordance with the operation on the touch panel 24 and the change of the orientation of the mobile terminal ff, the events are transmitted to the server SV, and the states of the mobile terminal ff and the server SV transition. The server SV registers the received events as the drawing history information of the pointer in the tables in the database DB. The tables of the database DB of the server SB will be described below.

[Example of Table]

FIG. 7 is a diagram illustrating the types of tables in the database DB of the server SV. In the embodiment, the database DB includes, for example, a connection table T1, a pointer drawing start/stop table T2, a pointer movement table T3, an area drawing start/stop table T4, an area drawing size control table T5, a sound recording start/stop table T6, and a page transition table T7.

In the connection table T1, an event indicating the connection/disconnection of communications with the server SV is accumulated. For example, the connection table T1 includes a device ID of the mobile terminal ff that is a transmission source of the communication connection/disconnection event, a time stamp at the time when the communication connection/disconnection event is received, and notification information indicating the type of the event. The time stamp is generated, for example, by the RTC 11 of the server SV.

In the drawing start/stop table T2, events indicating the start and stop of the pointer drawing are accumulated. The pointer drawing start/stop table T2 includes, for example, a device ID of the mobile terminal ff that transmitted the pointer drawing start/stop event, a time stamp at the time when the event is received, and notification information indicating the type of the event. In the pointer movement table T3, an event indicating the movement information of a drawn pointer is accumulated. The pointer movement table T3 includes, for example, a device ID of the mobile terminal ff that is a transmission source of the pointer movement event, a time stamp at the time when the event is received, and movement position information (X coordinate and Y coordinate).

In the area drawing start/stop table T4, events indicating the start and stop of the area drawing are accumulated. The area drawing start/stop table T4 includes, for example, a device ID of the mobile terminal ff that is a transmission source of the area drawing start/stop event, a time stamp at the time when the event is received, and notification information indicating the type of the event. In the area drawing size control table T5, an event representing size information of the drawn area pointer is accumulated. The area drawing size control table T5 includes, for example, a device ID of the mobile terminal ff that transmitted the area drawing size control event, a time stamp at the time when the event is received, and size information of the area pointer.

In the sound recording start/stop table T6, information of a sound file in which a speech made by an attendee using the mobile terminal ff is accumulated as an event. The sound recording start/stop table T6 includes, for example, a device ID of the mobile terminal ff that is a transmission source of the sound event, a time stamp at the time when the event is received, and notification information indicating start/stop. In the page transition table T7, page transition information is accumulated. The page transition table T7 includes, for example, a device ID of the mobile terminal ff that is a transmission source of the page transmission event, a time stamp at the time when the event is received, and information of the current page. That is, the page transition table T7 includes information of a displayed page corresponding to time. For example, the page transition event is generated on the basis of a flick operation on the touch panel 24.

Specific examples of the tables described in FIG. 7 will be described below.

[Connection Table T1]

Figure 8:
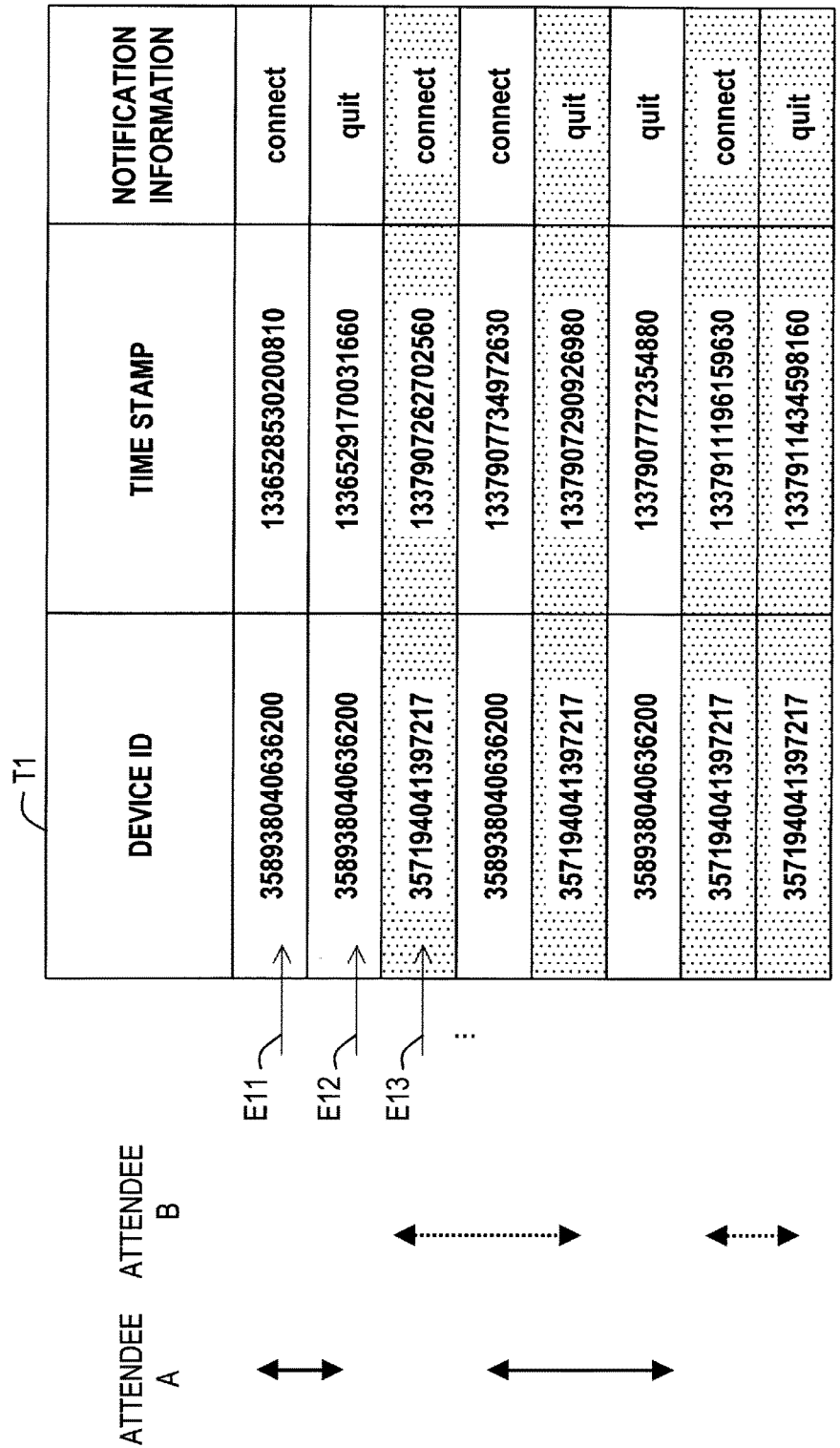
FIG. 8 is a diagram illustrating an example of the connection table T1.

FIG. 8 is a diagram illustrating an example of the connection table T1. In FIG. 8, a solid line arrow indicates a connected state of the mobile terminal fA of the attendee A, and a dashed line arrow indicates a connected state the mobile terminal fB of the attendee B. Information illustrated by halftone in the table represents information of the mobile terminal fB of the attendee B. As described above, the connection table T1 includes, for example, the device ID of the mobile terminal, the time stamp at the time when the event is received, and the notification information indicating the type of the event.

When an application starts in the mobile terminal fA of the attendee A, a connection start event is generated and transmitted to the server SV. Specifically, a connection start event E11 in the connection table T1 includes a device ID "358938040636200" of the mobile terminal fA, a time stamp "1336528530200810" at the time when the connection request is made, and the notification information "connect" indicating the connection.

In addition, when the application ends in the mobile terminal fA, a disconnection event is generated and transmitted to the server SV. A disconnection event E12 in the connection table T1 includes the device ID "358938040636200" indicating the mobile terminal fA, a time stamp "1336529170031660" at the time when the disconnection request is generated, and notification information "quit" indicating the disconnection.

The same applies to other connection/disconnection events. The event of the mobile terminal fB includes, as the device ID, an ID "357194041397217" different from the ID "358938040636200" indicating the mobile terminal fA. As described above, every time a mobile terminal is connected/disconnected to or from the server SV, the connection/disconnection event is generated and transmitted to the server SV to be accumulated in the connection table T1 in the server SV.

[Pointer Drawing Start/Stop Table T2]

FIG. 9 is a diagram illustrating an example of the pointer drawing start/stop table T2. Similar to the connection table T1, information illustrated by halftone in the table in FIG. 9 represents information of the mobile terminal fB of the attendee B. As described above, the pointer drawing start/stop table T2 includes, for example, the device ID of a mobile terminal, the time stamp at the time when the event is received, and the notification information indicating the type of the event.

When the long pressing on the touch panel 24 of the mobile terminal fA of the attendee A is detected, a pointer drawing start event is generated and transmitted to the server SV. Specifically, a pointer drawing start event E21 in the pointer drawing start/stop table T2 includes the device ID "358938040636200" indicating the mobile terminal fA, a time stamp "1336528530212410" at the time when the pointer drawing start event is generated, and the notification information "start" indicating the start.

When the finger in the long pressing state on the mobile terminal fA is separated from the touch panel 24, a pointer drawing stop event is generated and transmitted to the server SV. A pointer drawing stop event E22 in the pointer drawing start/stop table T2 includes the device ID "358938040636200" indicating the mobile terminal fA, a time stamp "1336529170031520" at the time when the pointer drawing stop event is generated, and notification information "stop" indicating the stop.

The same applies to other pointer drawing start/stop events. As described above, on the basis of an operation on the touch panel 24 of each mobile terminal, the pointer drawing start/stop event is generated and is transmitted to the server SV to be accumulated in the pointer drawing start/stop table T2 of the server SV.

[Pointer Movement Table T3]

FIG. 10 illustrates an example of the pointer movement table T3. The table in FIG. 10 includes pointer movement information of a mobile terminal. As described above, the pointer movement table T3 includes, for example, the device ID of a mobile terminal, the time stamp at the time when the event is received, and the movement position information (X coordinate and Y coordinate).

In the mobile terminal fA of the attendee A, when the long pressing is detected and the pointer drawing start event is transmitted, the pointer movement event is periodically generated and transmitted to the server SV. Specifically, a pointer movement event E31 in the pointer movement table T3 includes the device ID "358938040636200" indicating the mobile terminal fA, a time stamp "1336528533667670" at the time when the pointer drawing start event is generated, and movement position information "−2, −6". In the embodiment, the movement position information is movement coordinates on the display panel DP, generated on the basis of the orientation information. In this example, the movement position information "−2, −6" indicates that the position of the pointer is moved by −2 in the X coordinate direction and by −6 in the Y coordinate direction.

The same applies to other pointer movement events. As described above, on the basis of an operation on the touch panel 24 of each mobile terminal, the pointer movement event is periodically generated and transmitted to the server SV to be accumulated in the pointer movement table T3 of the server SV.

The generation processing for the movement position information is described below.

[Generation of Movement Position Information]

Figure 11:
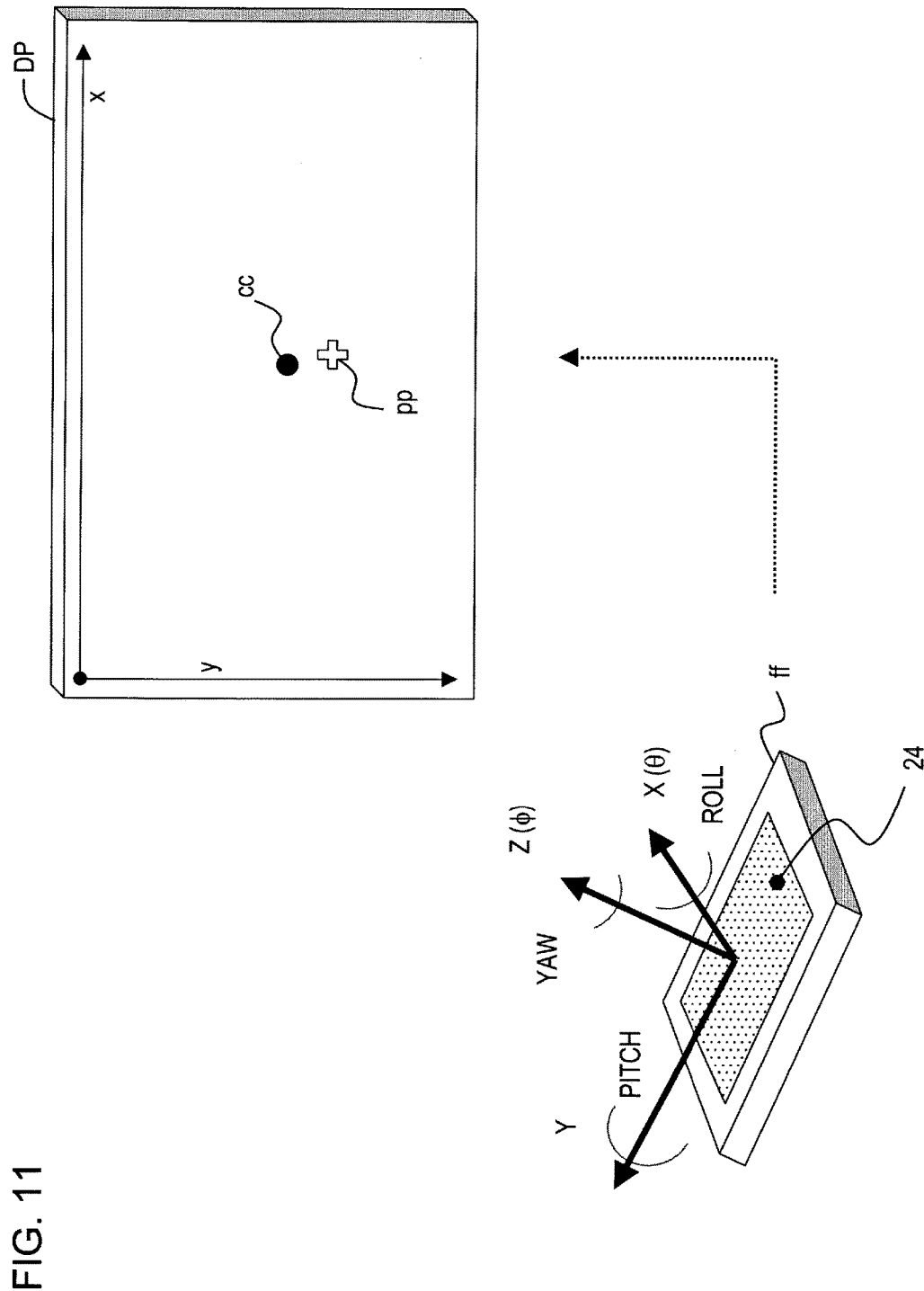
FIG. 11 is a diagram illustrating the generation processing for the movement position information based on the detected orientation information.

FIG. 11 is a diagram illustrating the generation processing for the movement position information based on the detected orientation information. As described above, the mobile terminal includes the gyro sensor 31, and senses the orientation of the mobile terminal therein to detect the orientation information. For example, the three axis gyro sensor 31 allows a rotation amount of the orientation of the mobile terminal to be estimated.

For example, the gyro sensor 31 detects the angular velocities about the three axes X, Y, and Z, respectively, and outputs the angular velocities to the orientation estimation unit 42. In this example, with respect to a facing direction (Z axis positive direction) of the touch panel 24 of a mobile terminal, a rotation direction about the X axis is defined as a roll direction, a rotation direction about the Y axis is defined as a pitch direction, and a rotation direction about the Z axis is defined as a yaw direction. For example, angular velocities θ and φ are inputted to the orientation estimation unit 42 from the gyro sensor 31, where θ is the angular velocity of Roll indicating the rotation of the mobile terminal in the X axis direction, and φ is the angular velocity of Yaw indicating the rotation of the mobile terminal in the Z axis direction.

After that, the orientation estimation unit 42 generates the movement position information of the pointer on the basis of the angular velocities corresponding to the axes. The orientation estimation unit 42 calculates the movement amount (distance) of coordinates indicating the movement position information of the pointer on the basis of Formulae 1 and 2. Furthermore, k is a coefficient representing time, and K is a coefficient representing a level of reflection of the changed angular velocity to the movement coordinate. In Formulae 1 and 2, $\varphi_0$ represents an initial angular velocity corresponding to the Z axis, and $\theta_0$ represents an initial angular velocity corresponding to the X axis. In other words, the numerals represent angular velocities corresponding to the respective axes at the time of long pressing. In addition, $\varphi(k)$ and $\theta(k)$ represent angular velocities corresponding to the respective axes after the lapse of the time k. In Formula 1, a changed value of the angular velocity corresponding to the Z axis after the lapse of the time k is multiplied by the coefficient K, and thus a movement amount $d_x(k)$ of the X coordinate after the lapse of the time k is calculated. Similarly, in Formula 2, a changed value of the angular velocity corresponding to the X axis after the lapse of the time k is multiplied by the coefficient K, and thus a movement amount $d_y(k)$ of the Y coordinate after the time k is calculated. Thus, the movement position information (for example, −2, −6 illustrated in FIG. 10) of the X axis and Y axis is generated.

$$d_x(k)=K(\varphi(k)-\varphi_0) \qquad \text{Formula 1}$$

$$d_y(k)=-K(\theta(k)-\theta_0) \qquad \text{Formula 2}$$

Furthermore, in accordance with Formulae 3 and 4, the coordinates of the pointer pp after the movement based on the movement position information is calculated. In FIGS. 3 and 4, $X_{center}$ and $Y_{center}$ represent coordinates of the center cc of the display panel DP. Thus, the coordinates x(k), y(k) of the pointer pp after the lapse of the time k are calculated by subtracting the movement amounts of the coordinates after the lapse of the time k from the center coordinates.

$$x(k)=X_{center}-d_x(k) \qquad \text{Formula 3}$$

$$y(k)=Y_{center}-d_y(k) \qquad \text{Formula 4}$$

The mobile terminal includes the acceleration sensor 32 in addition to the gyro sensor 31, and thus can calculate orientation information even more accurately. The acceleration sensor 32 detects accelerations in three axial directions of upper-lower direction, left-right direction, and front-rear direction, and outputs the accelerations to the orientation estimation unit 42. Thus, the accelerations are further taken into account, so that the orientation estimation unit 42 can generate even more highly accurate movement position information.

[Area Drawing Start/Stop Table T4]

FIG. 12 is a diagram illustrating an example of the area drawing start/stop table T4. Similar to the connection table T1, information illustrated by halftone in the table in FIG. 12 represents information of the mobile terminal fB of the attendee B. As described above, the area drawing start/stop table T4 includes, for example, the device ID of the mobile terminal, the time stamp at the time when the event is received, and the notification information indicating the type of the event.

When a movement of a predetermined amount or more of a finger is detected while long pressing is performed on the touch panel 24 of the mobile terminal fA of the attendee A, the area drawing start event is generated and transmitted to the server SV. Specifically, an area drawing start event E41 in the area drawing start/stop table T4 includes the device ID "358938040636200" indicating the mobile terminal fA, a time stamp "1336528530212410" at the time when the pointer drawing start event is generated, and the notification information "start" indicating the start.

When the finger returns to the initial pressing position in the mobile terminal fA, or the finger in the long pressing state is separated from the touch panel 24, the area drawing stop event is generated and transmitted to the server SV. An area drawing stop event E42 in the area drawing start/stop table T4 includes the device ID "358938040636200" indicating the mobile terminal fA, a time stamp "1336529170031520" at the time when the area drawing stop event is generated, and the notification information "stop" indicating the stop.

The same applies to other area drawing start/stop events. As described above, on the basis of an operation on the touch panel 24 of each mobile terminal, the area drawing start/stop event is generated and transmitted to the server SV to be accumulated in the area drawing start/stop table T4 of the server SV.

[Area Drawing Size Control Table T5]

Figure 13:
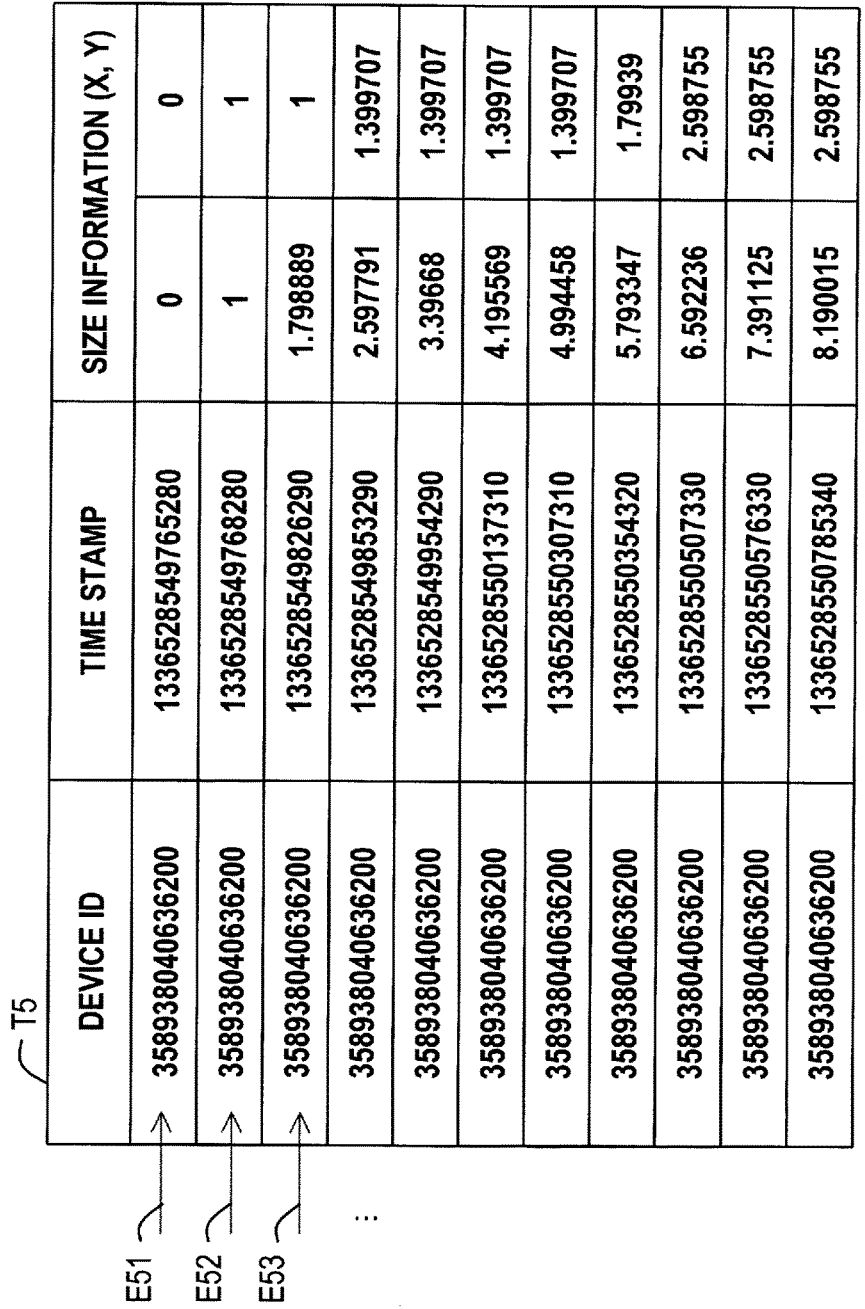
FIG. 13 is a diagram illustrating an example of the area drawing size control table T5 including the area drawing size control information of a mobile terminal.

FIG. 13 is a diagram illustrating an example of the area drawing size control table T5 including the area drawing size control information of a mobile terminal. As described above, the area drawing size control table T5 includes, for example, the device ID of the mobile terminal, the time stamp at the time when the event is received, and the area size.

When the area drawing start event is generated in the mobile terminal fA of the attendee A, the area drawing size control event is periodically generated and transmitted to the server SV. Specifically, an area drawing size control event E53 in the area drawing size control table T5 includes the device ID "358938040636200" indicating the mobile terminal fA, a time stamp "1336528549826290" at the time when the area drawing size control event is generated, and a size "1.798889, 1" of the area pointer. When the area pointer is an elliptical area with the pointer as the center, for example, the size of the area pointer indicates a radius 1.798889 in the X axis direction and a radius 1 in the Y axis of the elliptical shape. The area size is generated on the basis of the movement distance of the finger on the touch panel 24.

The same applies to other area drawing size control events. As described above, on the basis of an operation on the touch panel 24 of each mobile terminal, the area drawing size control event is generated and transmitted to the server SV to be accumulated in the area drawing size control table T5 of the server SV.

The generation processing for the size of the area pointer is described below.

[Generation of Size Information]

FIG. 14 is a diagram illustrating generation processing for the size of the area pointer. In the figure, the trajectory as a line LL represents the movement trajectory of the touched position of the finger in the touch panel 24. In FIG. 14, the area pointer ep is an elliptical area. The shape of the area pointer ep is not limited to the elliptical shape and may be rectangular, circular, and the like shape.

In the touch panel 24 of FIG. 14, a dot t1 represents a position on which the long pressing is performed. A halftone area e1 represents a dead zone area of a predetermined radius around the dot t1. In this example, when the finger performing the long pressing moves beyond the dead zone area e1, the area pointer ep having the elliptical shape and the like with the pointer pp as the center is started to be drawn. Here, a radius DTx of the area pointer ep displayed on the display panel DP is generated on the basis of a distance DT between an area drawing start position t2 beyond the dead zone area e1 and a current position t3 of the finger. In other words, the size of the area pointer ep to be drawn is controlled on the basis of the area drawing start position t2 and the current position t3 of the finger.

As described in the transition diagram of FIG. 6, when the area pointer ep is drawn, the server SV makes the transparent window on which the area pointer is drawn to be disposed as the front most screen of the display panel DP. For example, when the area pointers ep are simultaneously drawn by a plurality of mobile terminals, a plurality of transparent windows are disposed as the front most screens of the display panel DP of the server SV. This allows the plurality of area pointers ep to be drawn by the plurality of mobile terminals. Here, the area pointers are drawn, for example, with different colors and shapes so as to be identifiable.

[Sound Recording Start/Stop Table T6]

FIG. 15 is a diagram illustrating an example of the sound recording start/stop table T6. The table in FIG. 15 includes area drawing size control information of a mobile terminal. In addition, information illustrated by halftone in the table indicates information of the mobile terminal fB of the attendee B. As described above, the sound recording start/stop table T6 includes, for example, the device ID of the mobile terminal, the time stamp at the time when the event is received, and the notification information.

In this example, the sound acquisition is started when the pointer drawing is started in the mobile terminal fA. The sound acquisition may be started when a volume of a predetermined level or higher is detected. Thus, a sound recording start event is generated and transmitted to the server SV. Specifically, a sound recording start event E61 in the sound recording start/stop table T6 includes the device ID "358938040636200" indicating the mobile terminal fA, a time stamp "1336528530212410" at the time when the sound recording start event is generated, and the notification information "start" indicating the start.

When the pointer drawing in the mobile terminal fA is stopped, a sound recording stop event is generated, and is transmitted to the server SV together with a generated sound file which has a time stamp. Alternatively, the sound file may be transmitted to the server SV at a predetermined interval. The sound recording stop event may be generated when the volume of the sound drops to a predetermined level or lower. A sound recording stop event E62 in the sound recording start/stop table T6 includes the device ID "358938040636200" indicating the mobile terminal fA, the time stamp "1336529170031520" at the time when the sound recording stop event is generated, and the notification information "stop" indicating the stop.

The same applies to other sound recording start/stop events. As described above, on the basis of an operation on the touch panel 24 in each mobile terminal, the sound recording start/stop event is generated and transmitted to the server SV to be accumulated in the sound recording start/stop table T6 of the server SV.

The generation processing for the action information based on the tables in the database described in FIG. 7 to FIG. 15 will be described below.

[First Part of Generation Processing for Action Information]

Figure 16:
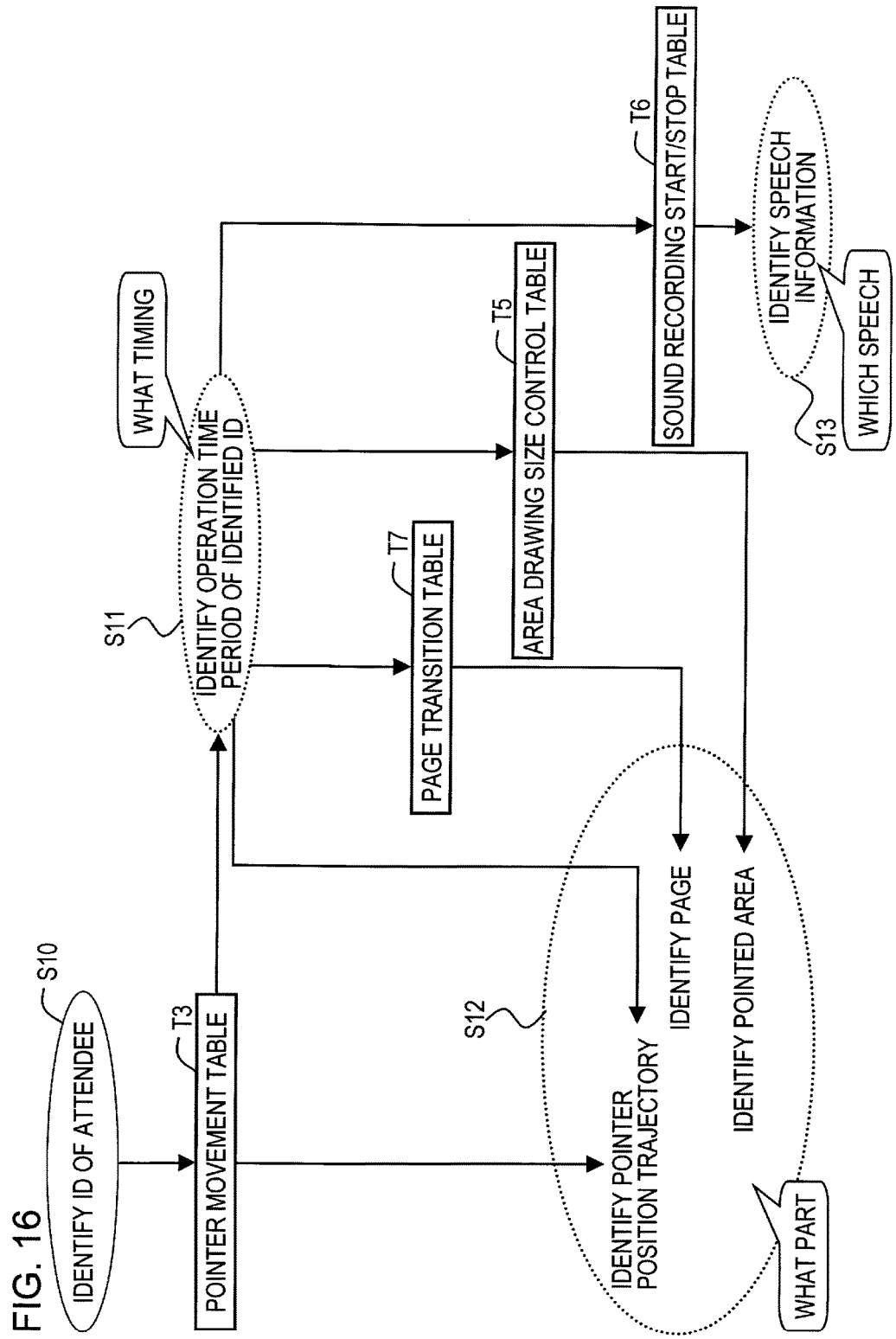
FIG. 16 is a diagram illustrating generation processing for the drawing position information of a pointer corresponding to a chronological displayed page of the conference material and generation processing for the sound position information at the time when the pointer is drawn.

FIG. 16 is a diagram illustrating generation processing for the drawing position information of a pointer corresponding to a chronological displayed page of the conference material and generation processing for the sound position information at the time when the pointer is drawn. First, the user identifies the device ID of the attendee as an action information generation target (S10). In addition, the action information generation unit 52 retrieves the time stamp of the pointer movement event by the device ID from the pointer movement table T3 based on the target device ID. Thus, the operation time period of the mobile terminal with the target device ID is identified (S11) and the chronological trajectory information of the drawing position of the pointer of the device ID (S12) is identified.

In addition, on the basis of the identified time period information, the action information generation unit 52 refers to the page transition table T7 and acquires the page information corresponding to the time period (S12). Furthermore, on the basis of the identified time period information, the action information generation unit 52 further refers to the area drawing size control table T5 and acquires the size information and the like of the area pointer corresponding to the time period (S12). Still furthermore, on the basis of the identified time period information, the action information generation unit 52 further refers to the sound recording start/stop table T6 and acquires the position information in the sound file corresponding to the time period (S13).

Thus, on the basis of the device ID, a page in a conference material, trajectory information of the drawing position of the pointer in the page (S11), the area in which the area pointer is drawn (S12), and the position information of the sound file (S13) are acquired. As described above, on the basis of the drawing history information of the pointer including the a history of drawing position information which has a time stamp corresponding to the page in the table, the server SV according to the embodiment generates the drawing position information of the pointer corresponding to the chronological displayed page of the conference material, and the sound position information indicating at least a part of the sound file at the time when the pointer is drawn.

Thus, the user can identify which position of which page in the conference material was pointed by the attendee using the mobile terminal with the device ID and what kind of speech was made by the attendee. That is, without attending the conference, on the basis of the action information, the user can detect who made what kind of speech on which position in which page of the conference material.

The generation processing for the drawing activeness level of a pointer as another piece of action information will be described below.

[Second Part of Generation Processing for Action Information]

Figure 17:
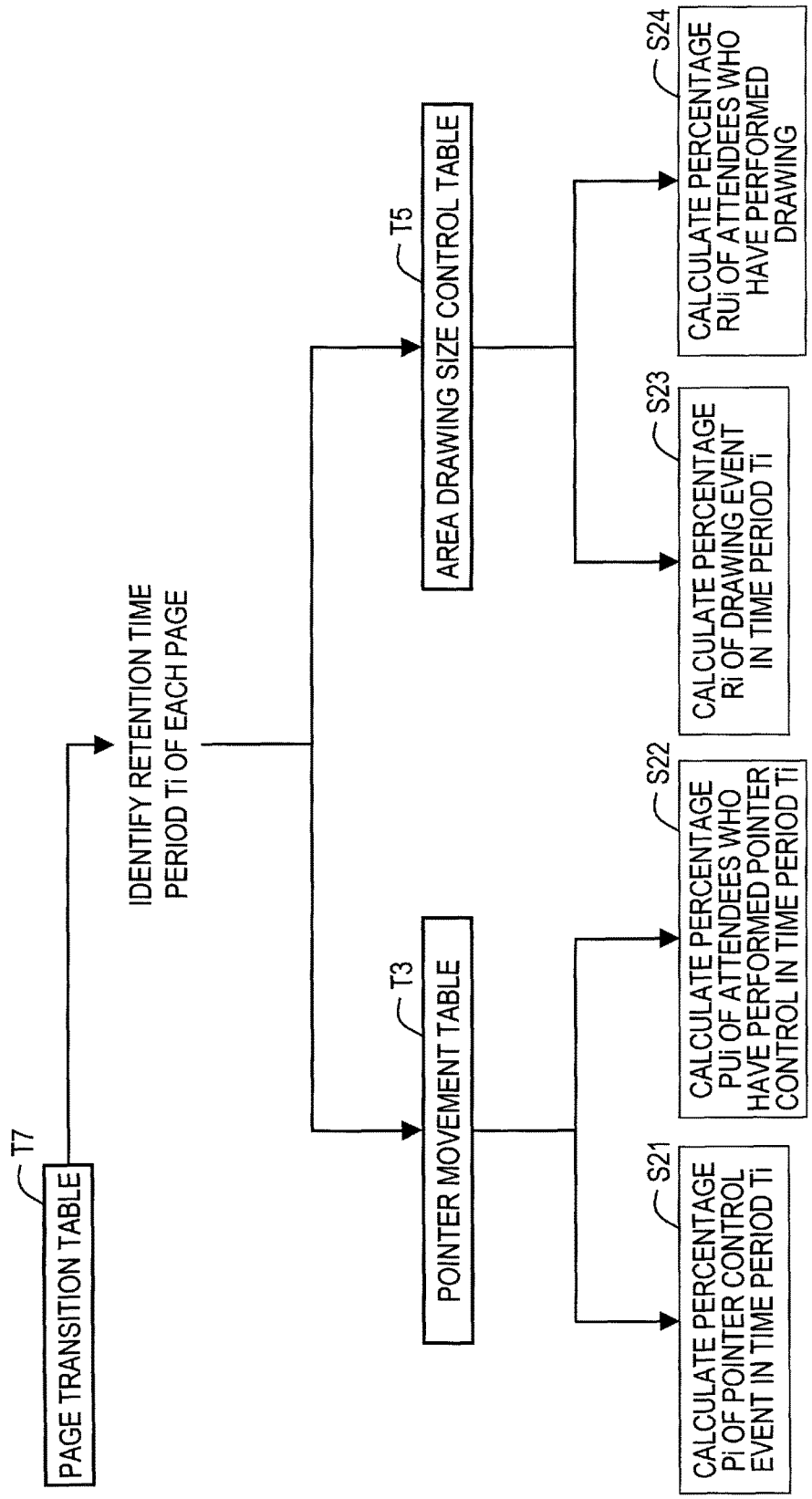
FIG. 17 is a diagram illustrating generation processing for the pointer drawing activeness level corresponding to a page and a displayed page.

FIG. 17 is a diagram illustrating generation processing for the pointer drawing activeness level corresponding to a page and a displayed page. In this example, a case is exemplified where the drawing activeness level of a displayed page is generated. It is to be noted that a drawing activeness level in a unit of a page is generated by a sum or an average of drawing activeness levels of displayed pages representing the same page. The action information generation unit 52 refers to the page transition table T7 to identify a display time period, that is, a retention time period $T_i$, of each displayed page.

First of all, the action information generation unit 52 refers to the pointer movement table T3 on the basis of the identified retention time period $T_i$ of each displayed page, and calculates percentages $P_i$ and $PU_i$ of a drawing amount of a pointer in a target displayed page in the total drawing amount (S21 and S22). First, the action information generation unit 52 calculates the percentage $P_i$ of the movement event in the retention time period $T_i$ in the total movement amount (S21). Specifically, the action information generation unit 52 refers to the pointer movement table T3 and calculates the percentage of the number of the pointer movement events in the retention time period $T_i$ in the total number of movement events in the conference as the percentage $P_i$ of the pointer movement event in the retention time period $T_i$. For example, when the total number of movement events in the conference is 100 and the number of pointer movement events in the retention time period $T_i$ is 10, the percentage $P_i$ is 10%.

In the embodiment, the pointer movement event is periodically generated in the pointer control state. Thus, the number of the pointer movement events indicates the drawing time of the pointer. That is, the percentage $P_i$ represents the drawing time of the pointer in the retention time period $T_i$ in the total drawing time of the pointer in the conference.

After that, the action information generation unit 52 calculates the percentage $PU_i$ of the attendees who have performed the pointer drawing during the retention time period $T_i$ (S22). Specifically, the action information generation unit 52 refers to the pointer movement table T3 and calculates the number of types of the IDs of devices that have transmitted the pointer movement event in the retention time period $T_i$ in the total number of attendees, that is, the percentage of the number of attendees who have performed the drawing, as the percentage $PU_i$. For example, when there have been five attendees in the conference, and the number of attendees who have drawn the pointer during the retention time period $T_i$ is two, the percentage $PU_i$ is 40%.

As the second step, the action information generation unit 52 refers to the area drawing size control table T5 on the basis of the identified retention time period $T_i$ of each displayed page, and calculates percentages $R_i$ and $RU_i$ of a drawing amount of an area pointer in a target displayed page in the total drawing amount (S23 and S24). First, the action information generation unit 52 calculates the percentage $R_i$ of the area drawing control event in the retention time period $T_i$ in the total number of area drawing control events (S23). Specifically, the action information generation unit 52 refers to the area drawing size control table T5 and calculates the percentage of the number of the area size control events in the retention time period $T_i$ in the total number of area size control events as the percentage $R_i$ of the area size control event in the retention time period $T_i$.

In the embodiment, the area size control event is periodically generated in the area drawing control state. Thus, the number of the area size control events indicates the drawing time of the area pointer. That is, the percentage $R_i$ represents the drawing time of the area pointer in the retention time period $T_i$ in the total drawing time of the area pointer in the conference.

Next, the action information generation unit 52 calculates the percentage $RU_i$ of the attendees who have performed the area pointer drawing during the retention time period $T_i$ (S24). Specifically, the action information generation unit 52 refers to the area drawing size control table T5 and calculates the number of types of the IDs of devices that have transmitted the area drawing size control event in the retention time period $T_i$ in the total number of attendees, that is, the percentage of the number of attendees who have performed the area pointer drawing, as the percentage $RU_i$.

Then, the action information generation unit 52 calculates the drawing activeness level on the basis of the calculated percentages $P_i$ and $PU_i$ of the drawing amount of the pointer and the percentages $R_i$ and $RU_i$ of the drawing amount of the area pointer. Formula 5 is a formula for calculating the drawing activeness level. In Formula 5, the percentages $P_i$ and $PU_i$ of the drawing amount of the pointer and the percentages $R_i$ and $RU_i$ of the drawing amount of the area pointer are summed up, and thus the drawing activeness level is calculated.

$$\text{Rank}_i = a_1 P_i + a_2 PU_i + a_3 P_i + a_4 PU_i (a_i \text{ is a weight coefficient}, \Sigma a_i = 1) \quad \text{Formula 5}$$

Similar to the example of Formula 5, weight coefficients $a_i$ may be assigned to the percentages $P_i$, $PU_i$, $R_i$, and $RU_i$ to be summed up. Thus, for example, by increasing the weight coefficients $a_3$ and $a_4$, the drawing activeness level of the pointer can be calculated with the higher level of reflection of the drawing amount of the area pointer (drawing time and the number of mobile terminals in which the drawing has been performed). Alternatively, for example, by increasing the weight coefficients $a_1$ and $a_3$, the drawing activeness level of the pointer can be calculated with the higher reflection level of the drawing time of the pointer and the area pointer.

As described above, in the conference system according to the embodiment, the drawing activeness level indicating the drawing amount of the pointer is generated as action information on the basis of the history of drawing position information included in the drawing history information of the drawn pointer accumulated in the server SV, in accordance with a page or a displayed page in the conference material. The drawing activeness level of the pointer is generated on the basis of a drawing amount of the pointer representing at least one of the drawing time of the pointer in a page and the number of the mobile terminals in which the drawing has been performed in such a manner that the drawing activeness level rises as the drawing amount of the pointer increases.

This allows the user to detect the page and displayed page of the pages of the conference material in which the largest amount of pointer is drawn, that is, the speeches and the discussion were most active. Thus, the user can detect the page as the key of the conference based on the activeness level, and further identify the position or a section of the sound file at the time when the page has been displayed. The drawing activeness level is applicable to the following case. For example, when products are respectively presented in different pages in a conference material in a conference such as business negotiation for products, on the basis of the drawing activeness level, the user can identify consumer appetite of a product in accordance with a page. For example, determination to focus the sales on the product on a page with a high drawing activeness level can be made.

[Third Part of Generation Processing for Action Information]

FIG. 18 is a drawing for explaining the generation processing for the pointer drawing activeness level corresponding to a position in a displayed page. In this example, a case is exemplified where the drawing activeness corresponding to a position in the displayed page is generated. For example, the drawing activeness level corresponding to the position in the page can be generated, for example, by summing up the drawing activeness levels of the displayed page representing the same page.

First of all, the action information generation unit 52 refers to the page transition table T7 and identifies the displayed time period, that is, a retention time period of each displayed page. After that, the action information generation unit 52 refers to the pointer movement table T3 on the basis of the identified retention time period of each displayed page, and detects the trajectory of the drawing position information of the pointer for each device ID. On the basis of the trajectory points at the drawing positions of the pointer, the smallest area including the trajectory points is obtained as a focused area. The focused area represents an area with a high drawing activeness level.

Specifically, when the area pointer has, for example, a rectangular shape, the action information generation unit 52 generates an axis aligned bounding box (AABB) structure on the basis of the set of two dimensional trajectory points. In addition, the action information generation unit 52 detects the rectangle of the smallest area with the AABB structure as the focused area. Alternatively, for example, the action information generation unit 52 extracts a smallest circular area through a smallest enclosing circle method based on the two dimensional trajectory points, and detects the area as the focused area. Thus, the action information generation unit 52 detects the focused area including the drawing position information of the pointer for each device ID.

In FIG. 18, for example, focused areas EA, EB, and EC respectively corresponding to three device IDs are illustrated. In this example, dotted line trajectories xa, xb, and xc represent trajectories of the drawing positions of the pointers respectively drawn by the mobile terminals fA, fB, and fC. The areas EA, EB, and EC are focused areas respectively based on the trajectory points xa, xb, and xc of the drawing positions of the mobile terminals. In addition, on the basis of the overlapped portion of the focused areas EA, EB, and EC, an area EZ with the highest drawing activeness, that is, the most highly focused area can be detected. In this example, the drawing activeness level is high in the position EZ with the highest overlapping level and is low in a position not corresponding to the focused areas.

As described above, the drawing activeness level indicating a drawing amount of a pointer is generated as the action information on the basis of the drawing history information of the drawn pointer including the history of drawing position information illustrated in a table, and in accordance with the position in a page of or a displayed page in the conference material. In addition, the pointer drawing activeness level is generated on the basis of the pointer drawing position information in a page, in such a manner that the drawing activeness level is high at a position in the page corresponding to the pointer drawing position.

Thus, the user can detect a position where the pointer is drawn and a position where the pointers are drawn in an overlapping manner in accordance with a position in a page and in a displayed page of the conference material. Thus, the user can detect the page in which the speeches and the discussion were most active and can detect the focused area in the page where the pointers are intensively drawn. For example, when different products are respectively presented in a plurality of portions in a page as a conference material in a conference such as business negotiation for the products, based on the drawing activeness levels corresponding to the positions in the page, the user can identify consumer appetite of a corresponding product.

As described above, the conference system according to the embodiment includes at least one server SV and at least one mobile terminal contactable to the server SV. The mobile terminal includes an orientation estimation unit configured to detect orientation information of the mobile terminal, an operation unit configured to detect operation information of an operation performed on the mobile terminal by the user (attendee), and an event transmission unit configured to transmit, to the server SV, the orientation information and the operation information respectively detected by the orientation estimation unit and the operation unit as a drawing event. The server SV includes: an image information generation unit configured to generate image information of a conference material including at least one page and image information of a pointer drawn over the image information of the conference material on the basis of the drawing event; and an action information generation unit configured to generate action information corresponding to the conference material on the basis of drawing history information of the drawn pointer.

Thus, the user can efficiently check the content of the conference by referring to the drawing position and the drawing amount of a pointer corresponding to each page in the conference material on the basis of the action information corresponding to the conference material. Furthermore, with the chronological action information corresponding to the pages of the conference material visualized as illustrated in FIG. 3, the user can more efficiently check the content of the conference material. In the conference system according to the embodiment, the mobile terminal such as a smartphone is used as a pointing device. Generally, a mobile terminal is originally equipped with the orientation estimation unit and the operation unit. Thus, no new device is additionally provided to the conference system. Accordingly, the conference system according to the embodiment uses an existing function of an existing mobile terminal, and thus allows a third person to check the content of the conference efficiently at a low cost.

The mobile terminal in the conference system according to the embodiment further includes a sound acquisition unit configured to acquire speech information of the user (attendee) and generate a sound file. The event transmission unit of the mobile terminal further transmits the sound file as a sound event, to the server SV. The action information generation unit of the server SV generates, as the action information, at least one of drawing position information of the pointer corresponding to a chronological displayed page of the conference material and sound position information indicating at least a part of the sound file at the time when the pointer is drawn, on the basis of a history of drawing position information included in the drawing history information of the drawn pointer.

Thus, on the basis of the drawing position information of the pointer corresponding to the chronological displayed page of the conference material, the user can detect in what position of which page in the conference material, the pointer is drawn. The user can further detect the position in the sound file at the time when the pointer is drawn corresponding to the chronological displayed page of the conference material. Thus, the user can detect what kind of speech an attendee with a mobile terminal made while pointing which position in which page in the conference material. Accordingly, on the basis of the action information, a third person who has not attended the conference can efficiently detect that who made what kind of speech on which position in which page in the conference material. Thus, preparing of minutes of the conference and repetition of listening of the conference sound can be omitted, and thus the content of the conference can be efficiently checked.

In the conference system according to the embodiment, the action information generation unit of the server SV generates, as the action information, a drawing activeness level indicating a drawing amount of the pointer corresponding to the chronological displayed page of the conference material or a position in the chronological displayed page of the conference material based on the history of drawing position information.

Thus, by referring to the drawing activeness level corresponding to the page or the displayed page, the user can detect a page or a displayed page in which a large amount of pointers are drawn. In addition, the user can detect the drawing position information of the pointer in the page detected on the basis of the drawing activeness level and the sound position information (section information) in the sound file at the time when the pointer is drawn. Thus, the user can detect which page or displayed page in the pages of the conference material, the largest amount of pointers has been drawn, that is, the speech and the discussion have been active, and can further detect the attendee who has made the speech and the content of the speech at that time.

In the conference system according to the embodiment, the action information generation unit of the server SV generates, as the action information, a drawing activeness level indicating a drawing amount of the pointer corresponding to the page of the conference material or a position in the page of the conference material, on the basis of the history of drawing position information included in the drawing history information of the drawn pointer. The action information generation unit may generate the drawing activeness level corresponding to a chronological displayed page of the conference material or a position in the chronological displayed page of the conference material.

Thus, the user can detect a position (focused area) in which a pointer has been drawn and a position (overlapping focused area) in which the pointers have been drawn in an overlapping manner, corresponding to the position in the page and the displayed page of the conference material. Thus, the user can detect the page in which the speech and the discussion have been most active, and also detect the position in the page where the pointers have been intensively drawn.

The drawing activeness level corresponding to the chronological displayed page of the conference material is generated on the basis of a drawing amount of the pointer indicating at least one of a drawing time of the pointer in the page and the number of the mobile terminals in which the drawing has been performed in the page, the history of drawing position information being identifiable the mobile terminals, in such a manner that the drawing activeness level rises as the drawing amount of the pointer increases. Thus, the drawing activeness level is generated not on the basis of the time period during which the page has been displayed, but on the basis of the drawing time of the pointer while the page has been displayed and the number of the mobile terminals is which the pointers have been drawn. Accordingly, the page in which the discussion and the speech have been substantially active in the conference can be detected as a page with a high drawing activeness level.

Alternatively, the drawing activeness level corresponding to the position in the chronological displayed page of the conference material is generated on the basis of drawing position information of the pointer in the page, in such a manner that the drawing activeness level is high at a position in the page corresponding to the drawing position of the pointer. Thus, in a case where a page includes a plurality of sections, a section in which the discussion and speeches have been substantially active can be detected.

The drawing activeness level may be independently generated for each mobile terminal. This allows a page or a displayed page in which a large amount of pointers have been drawn by each attendee to be detected. Furthermore, the focused areas of the respective attendees in a page can be detected.

In the embodiment, a single server SV executes the drawing processing of the pointer and the generation processing for the action information, and the embodiment is not limited to such an example. The conference system may include a first server SV that includes the image information generation unit and a second server SV that is different from the first server SV and includes the action information generation unit.

In the embodiment, the drawing activeness level of the pointer generated after the conference is over, and drawing activeness level may be generated at a predetermined time interval during the conference. For example, the drawing activeness level of the pointer is generated every 30 minutes. This allows the user to determine whether the conference is sufficiently active, based on the drawing activeness level during the conference. For example, in a conference such as a business negotiation and a presentation using a digital signage, the chairman of the conference can spice up the content of the conference by changing the content of speeches, presentation method, and the content of the conference material when the drawing activeness level has not reached an expected level.

The receiving processing of an event, the generation processing for the image information, and the generation processing for the action information executed by the server SV according to the embodiment may be recorded in a computer-readable recoding medium as a program and may be executed when the computer reads out and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A conference system comprising:
a server; and
mobile terminals connectable to the server, wherein each of the mobile terminals includes:
a first memory; and
a first processor connected to the first memory, wherein the first processor
detects orientation information of the mobile terminal;
detects operation information of an operation performed on the mobile terminal by a user; and
transmits, to the server, a drawing event based on the orientation information and the operation information, and
wherein the server includes:
a second memory; and
a second processor connected to the second memory, wherein the second processor
displays each of a plurality of pages of conference material, and changes displayed pages of the conference material in response to a page transition event to display one of the plurality of pages of the conference material in each display time period among a plurality of chronological display time periods;
generates a first image of a pointer drawn over a second image included in each of the plurality of pages of the conference material based on the drawing event;
displays, superimposed the first image of the pointer and the second image of the conference material in the display time period, in which the drawing event occurs, among the plurality of chronological display time periods;
stores drawing events of the pointer which is displayed on each of the plurality of pages of the conference material displayed during each display time period among the plurality of chronological display time periods, in association with the display time period, in a drawing history information database; and
generates a pointer activeness level that indicates a drawing amount of the pointer on each of the displayed pages of the conference material based on the drawing event and the display time periods stored in the drawing history information database,
wherein the drawing amount of the pointer on each of the display pages of the conference material is generated based on a number of the mobile terminals that perform drawing by the pointer on each of the displayed pages during the display time period and a total of the drawing time of the pointer during the display time period.

2. The conference system according to claim 1,
wherein the first processor acquires speech information of the user and generates a sound file,
wherein the first processor further transmits the sound file as a sound event to the server, and
wherein the second processor generates, as action information, at least one of displayed position information of the pointer corresponding to each of the displayed pages, and sound position information indicating a position of the sound file at a time when the pointer is displayed, based on a history of the displayed position information included in the displayed history information of the pointer.

3. The conference system according to claim 2, wherein the second processor generates the pointer activeness level corresponding to each of the displayed pages of the conference material, based on the history of the displayed position information.

4. The conference system according to claim 1, wherein the second processor generates the pointer activeness level corresponding to each of the displayed pages of the conference material, based on a history of displayed position information.

5. The conference system according to claim 1, wherein when a first page of the conference material is displayed before and after a second page of the conference material, the second processor treats the first page displayed before the second page and the first page displayed after the second page as different displayed pages of the conference material in a process of generating the display amount of the pointer on each displayed page of the conference material.

6. The conference system according to claim 1, wherein the second processor generates the pointer activeness level in such a manner that the pointer activeness level rises as the drawing amount of the pointer increases.

7. The conference system according to claim 1, wherein the pointer activeness level is independently generated for each of the mobile terminals.

8. The conference system according to claim 1, wherein the server includes:
a first server that generates the first image information; and
a second server, different from the first server, which generates the displayed history information and the pointer activeness level.

9. The conference system according to claim 1, wherein the drawing event includes a pointer movement event by which movement of the displayed position of the pointer is instructed.

10. The conference system according to claim 1, wherein the drawing event includes an area display control event by which displaying of a size variable area using a displayed position of the pointer as a base point is instructed.

11. A server connectable to a plurality of mobile terminals, the server comprising:

a receiver configured to receive orientation information and operation information of an operation performed by a user, detected by any of the mobile terminals, as a drawing event;

a memory; and a processor, connected to the receiver and the memory, configured to display each of a plurality of pages of conference material, change displayed pages of the conference material in response to a page transition event to display one of the plurality of pages of the conference material in each display time period among a plurality of chronological display time periods;

generate a first image of a pointer drawn over a second image included in each of the plurality of pages of the conference material based on the drawing event;

display superimposed the first image of the pointer and the second image of the conference material in the display time period, in which the drawing event occurs, among the plurality of chronological display time periods;

stores drawing events of the pointer which is displayed on each of the plurality of pages of the conference material displayed during each display time period among the plurality of chronological display time periods, in association with the display time period, in a drawing history information database; and generate a pointer activeness level that indicates a drawing amount of the pointer on each of the displayed pages of the conference material based on the drawing event and the display time periods stored in the drawing history database, wherein the drawing amount of the pointer on each of the display pages of the conference material is generated based on a number of the mobile terminals that perform drawing by the pointer on each of the displayed pages during the display time period and a total of the drawing time of the pointer during the display time period.

12. A non-transitory computer-readable medium storing a conference information generation program configured to cause a server, connectable to mobile terminals, to execute conference information generation processing, the conference information generation processing comprising:

receiving orientation information and operation information of an operation performed by a user, detected by any of the mobile terminals, as a drawing event;

displaying each of a plurality of pages of conference material, changing displayed pages of the conference material in response to a page transition event to display one of the plurality of pages of the conference material in each display time period among a plurality of chronological display time periods;

generating a first image of a pointer drawn over a second image included in each of the plurality of pages of the conference material based on the drawing event;

displaying superimposed the first image of the pointer and the second image of the conference material in the display time period, in which the drawing event occurs, among the plurality of chronological display time periods;

storing drawing events of the pointer which is displayed on each of the plurality of pages of the conference material displayed during each display time period among the plurality of chronological display time periods, in association with the display time period, in a drawing history information database; and generating a pointer activeness level that indicates a drawing amount of the pointer on each of the displayed pages of the conference material based on the drawing event and the display time periods stored in the drawing history database, wherein the drawing amount of the pointer on each of the display pages of the conference material is generated based on a number of the mobile terminals that perform drawing by the pointer on each of the displayed pages during the display time period and a total of the drawing time of the pointer during the display time period.

* * * * *